US006249295B1

(12) United States Patent
Kiyohara et al.

(10) Patent No.: US 6,249,295 B1
(45) **Date of Patent: *Jun. 19, 2001**

(54) RECORDING APPARATUS WITH SELF-STANDING RECORDING UNIT AND SHEET SUPPLYING APPARATUS

(75) Inventors: Takehiko Kiyohara, Zama; Atsushi Noda, Kawasaki; Yoji Ara, Yokohama; Makoto Kashimura; Hiroyuki Hagiwara, both of Tokyo; Tetsuhiro Nitta, Yokohama; Yasuhiro Unosawa, Tokyo, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/198,383

(22) Filed: Feb. 18, 1994

Related U.S. Application Data

(63) Continuation of application No. 07/813,829, filed on Dec. 27, 1991, now abandoned.

(30) Foreign Application Priority Data

| | | |
|---|---|---|
| Dec. 28, 1990 | (JP) | 2-408951 |
| Dec. 29, 1990 | (JP) | 2-417127 |
| Dec. 29, 1990 | (JP) | 2-417128 |
| Dec. 29, 1990 | (JP) | 2-417129 |
| Dec. 29, 1990 | (JP) | 2-417130 |
| Dec. 29, 1990 | (JP) | 2-417131 |
| Dec. 29, 1990 | (JP) | 2-417132 |

(51) Int. Cl.[7] .................... G01D 15/24

(52) U.S. Cl. .................... 346/134; 347/104

(58) Field of Search .................... 346/134, 145; 271/162, 164; 400/624, 625, 629, 692, 693; 347/104

(56) References Cited

U.S. PATENT DOCUMENTS

| | | | | |
|---|---|---|---|---|
| 4,313,124 | | 1/1982 | Hara . | |
| 4,345,262 | | 8/1982 | Shirato et al. . | |
| 4,459,600 | | 7/1984 | Sato et al. . | |
| 4,463,359 | | 7/1984 | Ayata et al. . | |
| 4,558,333 | | 12/1985 | Sugitani et al. . | |
| 4,699,366 | | 10/1987 | Kashimura et al. | 271/4 |
| 4,723,129 | | 2/1988 | Endo et al. . | |
| 4,740,796 | | 4/1988 | Endo et al. . | |
| 4,772,007 | | 9/1988 | Kashimura | 271/22 |
| 4,778,168 | | 10/1988 | Kashimura et al. | 271/4 |
| 4,828,146 | * | 5/1989 | Pensavecchia et al. | 440/629 X |
| 4,968,016 | * | 11/1990 | Koyama | 271/162 X |
| 4,997,179 | * | 3/1991 | Mizutani et al. | 400/625 X |
| 5,454,555 | * | 10/1995 | Kiyohara et al. | 271/9 |

FOREIGN PATENT DOCUMENTS

| | | | | |
|---|---|---|---|---|
| 0317171 | | 5/1989 | (EP) | B41J/3/04 |
| 418793 | * | 3/1991 | (EP) . | |
| 54-56847 | | 5/1979 | (JP) . | |
| 59-123670 | | 7/1984 | (JP) . | |
| 59-138461 | | 8/1984 | (JP) . | |
| 60-71260 | | 4/1985 | (JP) . | |
| 0116566 | * | 6/1986 | (JP) | 400/625 |

* cited by examiner

*Primary Examiner*—Benjamin R. Fuller
*Assistant Examiner*—C Dickens
(74) *Attorney, Agent, or Firm*—Fitzpatrick, Cella, Harper & Scinto

(57) ABSTRACT

The present invention provides a recording apparatus having a detachable automatic sheet supplying apparatus, wherein a projection protruding substantially in a horizontal direction is formed on the recording system or on the automatic sheet supplying apparatus, so that they can stand by themselves; a recess is formed in the automatic sheet supplying apppa-ratus or in the recording system; and the recording system is connected to the automatic sheet supplying apparatus by fitting the projection into the recess.

35 Claims, 25 Drawing Sheets

RECORDING APPARATUS WITH SELF-STANDING RECORDING UNIT AND SHEET SUPPLYING APPARATUS

This application is a continuation of application Ser. No. 07/813,829, filed Dec. 27. 1991, now abandoned.

BACKGROUND OF THE INVENTION

1. Field of the Invention

The present invention relates to a recording system having an automatic sheet supplying apparatus, and more particularly, it relates to a recording system having a removable automatic sheet supplying apparatus.

2. Related Background Art

In a recording system such as a printer, copying machine, facsimile and the like, which is used with a computer, word processor or the like, or is used independently, a sheet-shaped recording medium such as a paper or a thin plastic sheet is supplied and fed and an image is recorded on the recording medium in accordance with image information. Such recording systems can be grouped into ink jet recording systems, wire dot recording systems, thermal recording systems and laser beam recording systems.

Among them, the ink jet recording system records an image by discharging ink from a recording means (recording head) onto a recording medium and has many advantages. For example, with an ink jet recording system it is possible to record the image with high resolving power at a high speed, to record the image on a plain paper without special treatment of the paper, there is less noise due to non-impact recording method, and a color image can easily be recorded with plural color inks. In particular, it is possible to record an image at a higher speed by using an ink jet recording system of a line type wherein a number of ink discharge openings are arranged along a direction transverse to a width of the recording medium.

Particularly, the ink jet recording means that utilizes heat as ink discharging energy can easily be manufactured with a high density liquid passage arrangement (high density discharge opening arrangement) by forming electrical/thermal converters, electrodes and liquid passage walls on or in a substrate plate and forming a top plate by using a semi-conductor manufacturing process such as etching, and/or depositing techniques.

In such a recording system, recording sheets used as the recording media may consist of thicker sheets such as post cards, envelops or the like, or special sheets such as thin plastic sheets, as well as plain paper. The recording sheets may be manually supplied one by one or may be automatically and continuously supplied by an automatic sheet supplying apparatus.

Generally, the automatic sheet supplying appaaratus comprises a sheet supply drive unit for rotating a sheet supply roller to feed out a recording sheet, and a sheet supply cassette unit for stacking the recording sheets, and is constructed so that the recording sheet is separated and supplied one by one by driving the sheet supply roller in synchronous with a sheet feeding means of the recording system: However, in a conventional recording system to which an automatic sheet supplying apparatus is connected, there arose a problem in that a large installation space was required when the sheet supplying apparatus was connected to the recording system. Further, if the installation space required when the both are connected is reduced, then when the sheet supplying apparatus is detached from the recording system, the respective systems will be unstable and the accommodating space will be increased. In addition, since it is very difficult to ensure the required positioning accuracy when the both are connected, it takes a long time to connect the sheet supplying apparatus to the recording system, and the accuracy in the feeding of the recording sheet is worsened.

In FIG. 25 schematically showing a conventional technique, an ink jet recording system 110 includes therein a sheet conveying means (platen roller) 111, and a carrier means 112 on which a recording head is mounted. On the other hand, an automatic sheet supplying apparatus 113 includes therein a sheet supply roller 115 for supplying a recording sheet 114. By rotating the sheet supply roller 115, the recording sheet 114 is supplied into the ink jet recording system 110 via a guide roller 116. In this case, the positional relation between the recording system and the sheet supplying apparatus is determined by a condition that the both are installed on a table 117. If a surface of the table is rough, the positional relation between the recording system and the sheet supplying apparatus will be disordered, with the result that the recording sheet cannot be properly supplied, thus causing a poor sheet supply.

SUMMARY OF THE INVENTION

The present invention aims to eliminate the above-mentioned conventional drawback, and an object of the present invention is to connect an automatic sheet supplying apparatus to a recording system easily with high accuracy.

Another object of the present invention is to connect an automatic sheet supplying apparatus to a recording system compactly.

A further object of the present invention is to reduce an accommodating space for accommodating an automatic sheet supplying apparatus and a recording system when they are disconnected from each other.

In order to achieve the above object, the present invention provides a recording system detachably connectable to an automatic sheet supplying apparatus, wherein a projection extending to a substantially horizontal direction is formed on a back surface of the recording system and a recess is formed in the automatic sheet supplying apparatus at a position corresponding to the projection of the recording system, and the automatic sheet supplying apparatus is connected to the recording system while guiding and inserting the projection into the recess. In this case, by arranging a control substrate plate within the recess, it is possible to save space and to make the assembly more compact.

According to the present invention, for example, there is provided an ink jet system for recording an image on a recording sheet by discharging ink, comprising a sheet supply unit having a recording sheet stacking portion and a sheet supply means for feeding the recording sheet stacked in the stacking portion, and a recording unit for recording an image on the recording sheet. Wherein, when the sheet supply unit and the recording unit are mounted, one of the units is mounted on the other unit while floating the former in accordance with a mounting operation between the sheet supply unit and the recording unit.

With this arrangement, since the connection between both units is determined by positioning means provided at an inlet and an outlet for feeding the recording sheet, the proper recording sheet feeding path is always established regardless of the installation position of the system, thus eliminating the poor sheet feeding.

Further, the present invention also provides an automatic sheet supplying apparatus detachably connectable to a recording system, wherein a sheet supply cassette unit and a sheet supply drive unit are mounted on a support, with the support also acting as at least a part of an ejection tray. With this arrangement, the automatic sheet supplying apparatus can easily be connected to the recording system with the reduced installation space, and, even when the automatic sheet supplying apparatus is detached from the recording system, it can be stably rested, thus providing an automatic sheet supplying apparatus capable of reducing the installation space.

Further, in addition to the above arrangement, the present invention also provides an automatic sheet supplying apparatus wherein a frame is secured to the above-mentioned support, the above-mentioned sheet supply cassette unit and sheet supply drive unit are mounted on the frame, a manual sheet supply inlet is provided below the sheet supply cassette unit, a retractable ejection tray unit is incorporated within the support, and a recess is formed between the support and the frame so that, when the automatic sheet supplying apparatus is connected to the recording system, both are connected to each other while a projection of the recording system is inserted into the recess. According to this arrangement, in addition to the above advantage, it is possible to provide an automatic sheet supplying apparatus which is more stable and more compact.

Further, the present invention also provides an automatic sheet supplying apparatus detachably connectable to a recording system, wherein an ejection tray unit is retractably incorporated within a support for supporting a sheet supply cassette unit and a sheet supply drive unit, rack gears are formed on both sides of the support, and gears meshed with the rack gears are attached to both sides of the ejection tray unit, whereby the gears are rotated along the rack gears in response to the insertion and retraction of the ejection tray unit. With this arrangement, even when the automatic sheet supplying apparatus is detached from the recording system, it can be stably maintained, and the containing ability and operability of the ejection tray unit are improved and the automatic sheet supplying apparatus can be connected to the recording system with reduced installation space.

Furthermore, the present invention also provides an automatic sheet supplying apparatus detachably connectable to a recording system, wherein an ejection tray unit is retractably incorporated within a support for supporting a sheet supply cassette unit and a sheet supply drive unit, and a pushing projection protruding from a rear side of the support is formed on the ejection tray unit, whereby, after the projection is inserted to push the ejection tray unit forwardly, the ejection tray unit can be retracted by pulling a forward end of the unit by hand. With this arrangement, even when the automatic sheet supplying apparatus is detached from the recording system, it can be stably maintained, and the containing ability and operability of the ejection tray unit are improved and the automatic sheet supplying apparatus can be connected to the recording system with reduced installation space.

Further, the present invention also provides an automatic sheet supplying apparatus detachably connectable to a recording system, wherein an ejection tray unit is retractably incorporated within a support for supporting a sheet supply cassette unit and a sheet supply drive unit, and the ejection tray unit comprises a plate-shaped ejection tray, an ejection sheet support rockable between a folded position where it is folded with respect to the ejection tray and an extended position where it is extended in a sheet ejecting direction, and a pair of left and right sub-plates rockable between a folded position and a cocked position with respect to the ejection tray and adapted to support a waist of an ejected recording sheet at the cocked position, whereby the sub-plates are rocked in response to the rotation of the ejection sheet support. With this arrangement, even when the automatic sheet supplying apparatus is detached from the recording system, it can be stably maintained, and the automatic sheet supplying apparatus can be constructed compactly, and the ejection tray can easily accommodate various kinds and sizes of sheets and has the excellent containing ability and operability.

Further, in addition to the above arrangement, by adopting a further arrangement wherein a sheet stopper for regulating a leading end of a recording sheet upon the initiation of movement thereof is mounted on the ejection sheet support for slidable movement in the sheet ejecting direction and the stopper can be retracted and extended in the sheet ejecting direction by means of a slide mechanism, it is possible to achieve the above-mentioned advantages more easily. Further, the present invention also provides an automatic sheet supplying apparatus having a sheet supply cassette unit and a sheet supply drive unit and detachably connectable to a recording system, wherein the sheet supply cassette unit is constituted by a cassette case, separating pawl members mounted within the cassette case and a pressure plate for urged stacked recording sheets against inner surfaces of the separating pawl members, and guides for regulating the height of the stacked sheets are arranged on both sides of the pressure plate, the height of the guides being set so that, when the pressure plate is pressed down, they are positioned lower than the separating pawl members, and, when the pressure plate is pressed up, they are positioned higher than the separating pawl members. With this arrangement, when the pressure plate is released to replenish the recording sheets, the recording sheets can easily be replenished correctly, and, when the recording sheets are pressed by the pressure plate to separate and supply the recording sheet, the stacked recording sheets are urged against only the separating pawl members, thus greatly reducing the load for feeding the sheet and, feeding the sheet smoothly and correctly.

Further, the present invention provides an automatic sheet supplying apparatus detachably connectable to a recording system, wherein a sheet supply cassette unit and a sheet supply drive unit are mounted on a frame of the apparatus, and, in a mounted condition, by rotatably abutting concave and convex engagement portions formed on a chassis of the sheet supply drive unit and a cassette case of the sheet. supply cassette unit against each other, a distance between a sheet supply roller rotatably mounted on the chassis and separating pawls mounted on the cassette case is regulated. With this arrangement, it is possible to position the sheet supply cassette unit and the sheet supply drive unit easily and correctly with a simple construction, and to improve the reliability of the sheet supply and the operability of the apparatus.

BRIEF DESCRIPTION OF THE DRAWINGS

FIG. 20 is an exploded perspective view for explaining of the assembling of a shield plate, circuit board, cover and the like;

DETAILED DESCRIPTION OF THE PREFERRED EMBODIMENTS

The present invention will now be explained in connection with embodiments thereof with reference to the accompanying drawings.

Figure 1:
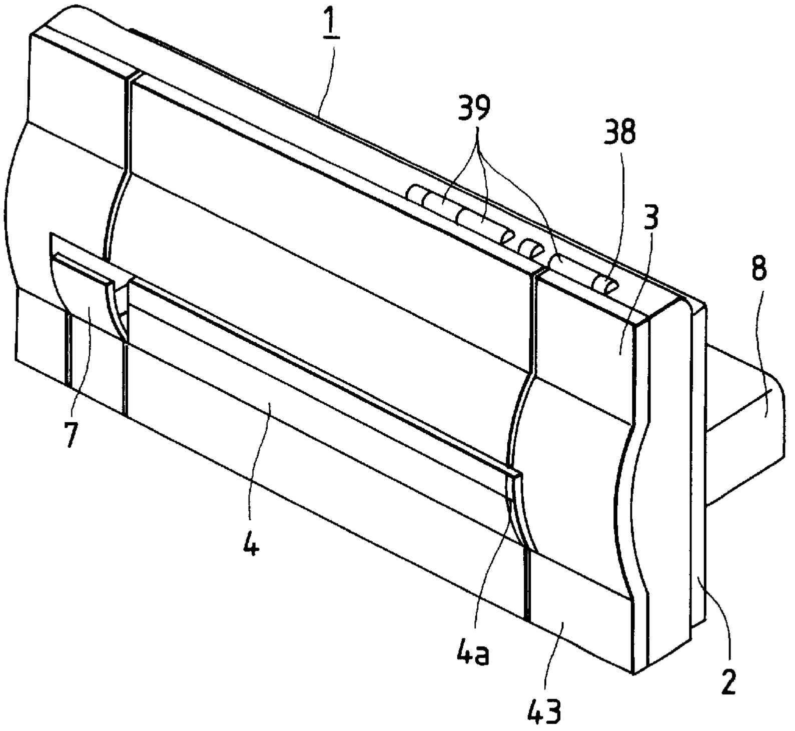
FIG. 1 is a perspective view of a recording system according to an embodiment of the present invention in an inoperative condition.
Figure 2:
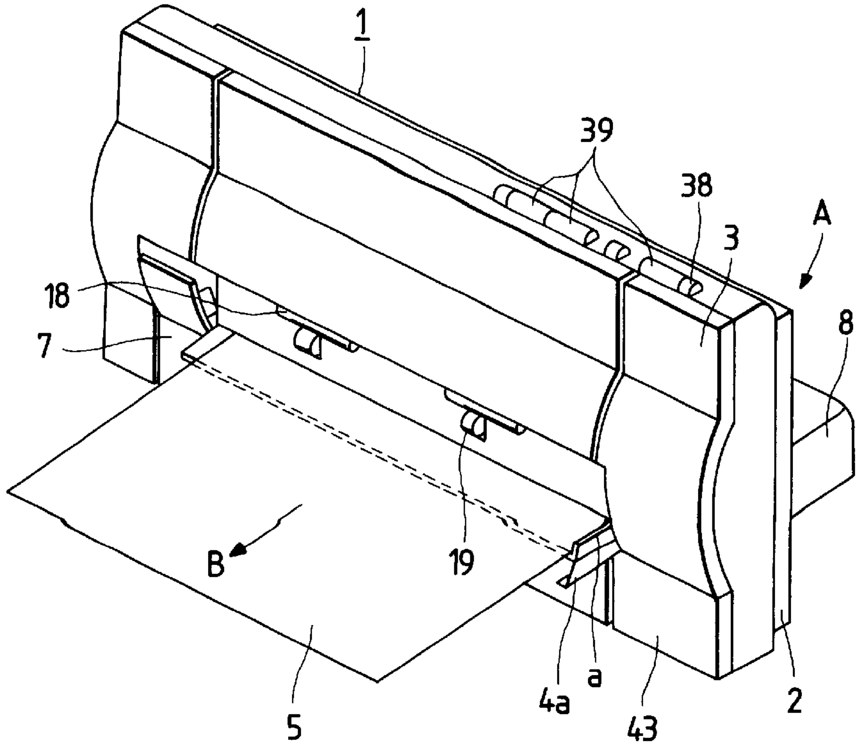
FIG. 2 is a perspective view of the recording system in an operative condition.
Figure 3:
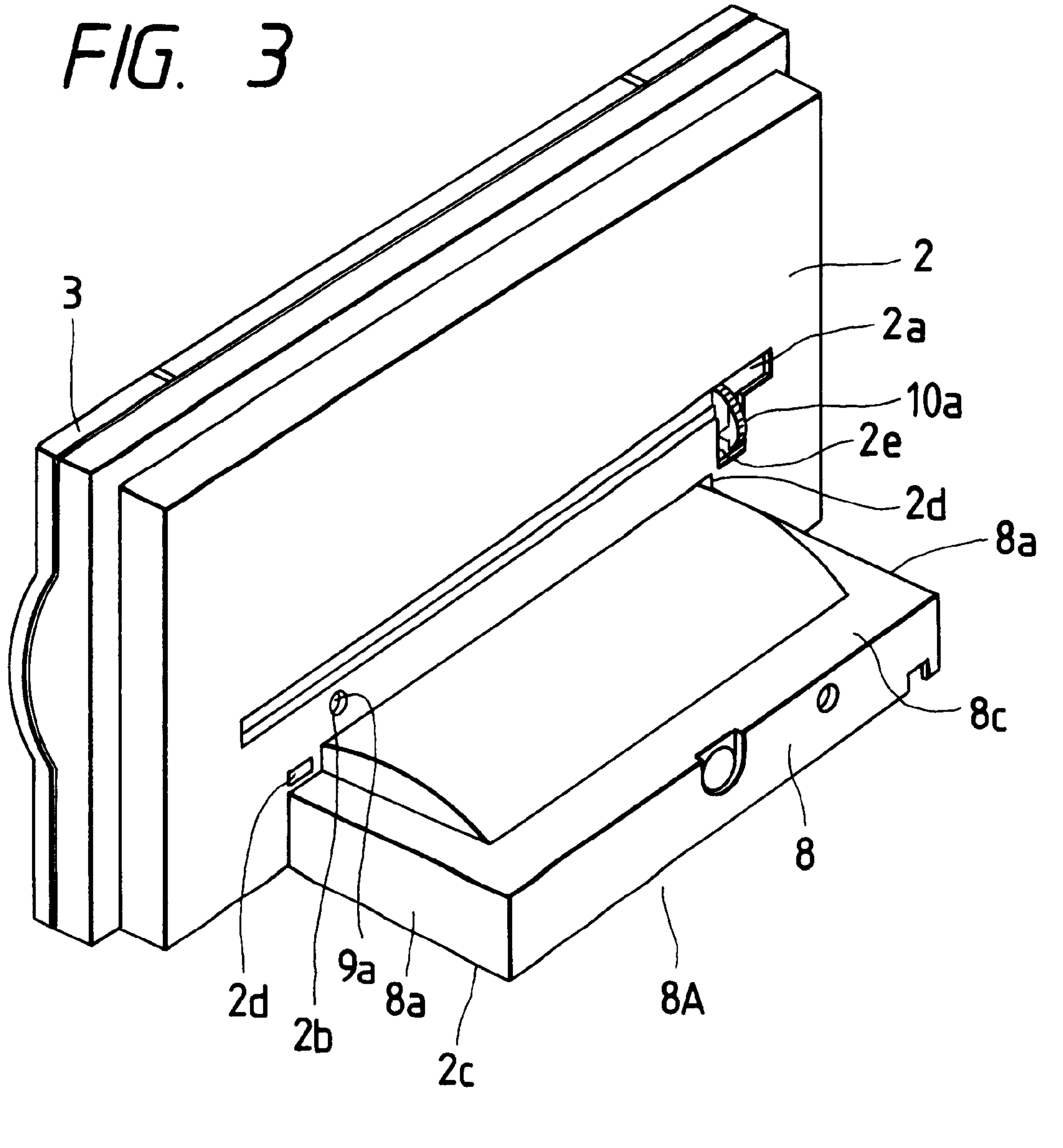
FIG. 3 is a perspective view of the recording system looked at from the arrow A in FIG. 2.

FIGS. 1 to 3 are perspective views of an ink jet recording system according to the present invention.

In FIGS. 1 to 3, an ink jet recording system 1 comprises a lower case 2, an upper cover 3 and an input door 4 which is closed in an inoperative condition as shown in FIG. 1. In use, the input door 4 is opened by extracting a knob 4*a*. An end face a of the knob 4*a* is used to position a recording sheet 5, and, the recording is permitted by inserting the recording sheet into the recording system from direction shown by the arrow A. The recording system inlcudes operation keys 39 consisting of an online key, a paper feed key and a power ON/OFF key (from left to right in FIG. 1). A release lever 7 has a releasing function for removing the recording sheet 5 when the latter is jammed in the recording system 1. The reference numeral 8 denotes a circuit board cover. FIG. 3 is a view looked at from the direction shown by the arrow A in FIG. 2.

In FIG. 3, the circuit board cover 8 serves to cover a circuit board. When the cover is attached to the recording system, the system has L-shaped sides, and can be stably rested or installed in a standing condition. That is to say, in the illustrated embodiment, a vertical portion containing a recording portion and the like and a horizontal portion containing the circuit board and the like form an L-shaped structure, and the horizontal portion containing the circuit board also acts as a leg or foot for the recording system. Incidentally, by opening the upper cover 3, it is possible to install of an ink jet recording head and to replace the used-up (ink empty) ink jet recording head by with a new one. In FIG. 3, holes 2*b*, 2*e* formed in the lower case 2 are used to position the recording system when the system is connected to an automatic sheet supplying apparatus which will be described later. A slit 2*a* serves as a recording sheet inlet when the recording sheet 5 is fed from the automatic sheet supplying apparatus to the recording system 1.

The reference numeral 10*a* denotes a gear for transmitting a driving power from the recording system to the automatic sheet supplying apparatus having no self-driving source. The gear 10*a* is meshed with a gear of the automatic sheet supplying apparatus (described later). Positioning and abutment dowels 9*a*, 9*b* are formed within the holes 2*b*, 2*e*, respectively, and can be abutted against surfaces of dowels 101*b*, 110*c* which will be described later. Incidentally, the dowel 101*b* may be formed on the recording system and the hole 2*b* may be formed in the automatic sheet supplying apparatus.

Figure 4A:
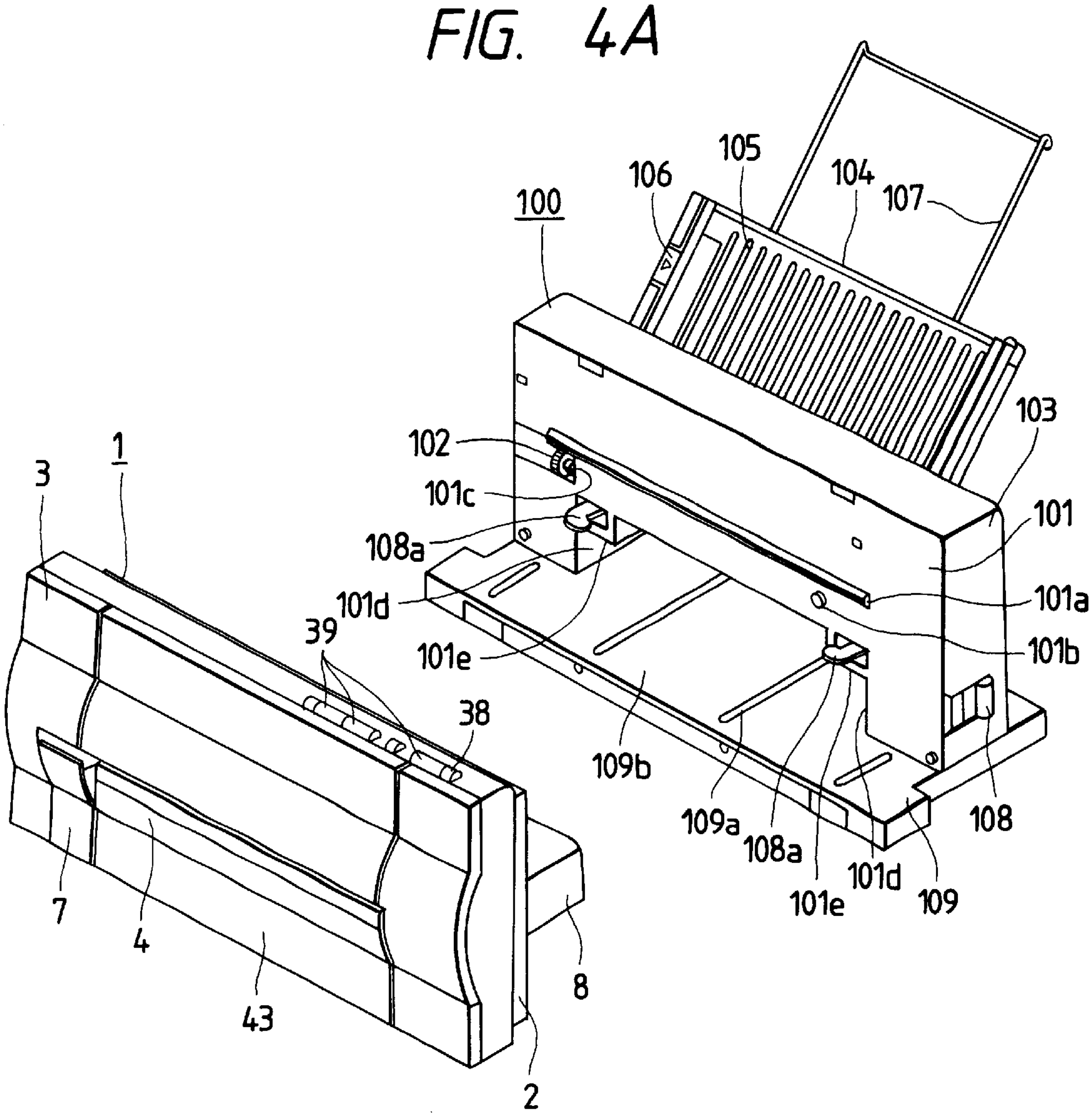
FIGS. 4A and 4B are perspective views showing the recording system and an automatic sheet supplying apparatus.
Figure 4B:
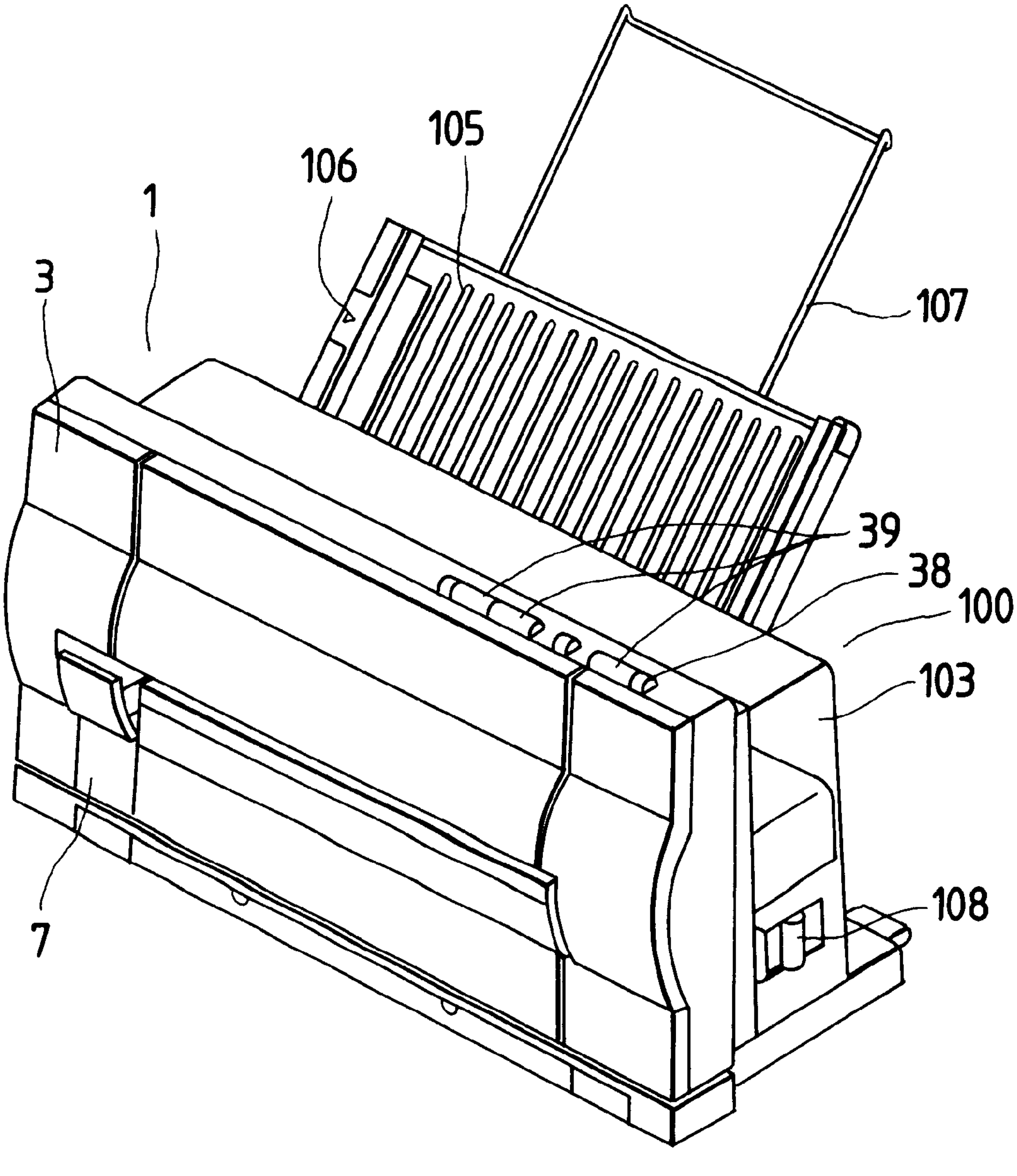

When the ink jet recording system 1 is connected to the automatic sheet supplying apparatus 100 shown in FIG. 4, the recording sheet can be automatically supplied to the recording system in accordance with the recording condition. FIG. 4A is a perspective view showing a condition before the recording system is connected to the automatic sheet supplying apparatus, and FIG. 4B is a perspective view showing a condition after the recording system has been connected to the automatic sheet supplying apparatus.

Next, the automatic sheet supplying apparatus 100 will be described.

In FIGS. 4A and 4B, a main chassis 101 incorporates therein rollers for supplying the recording sheet, and a transmission gear 102 is also mounted on the main chassis. The transmission gear 102 is engaged by a gear portion 10*a* of a sheet feed roller 10 (FIG. 5) of the recording system 1, so that the driving power is transmitted from the sheet feed roller to the automatic sheet supplying apparatus. A speed of the transmission gear 102 is reduced to rotate the sheet supply rollers (not shown), thereby picking-up the recording sheet 5. Thereafter, the recording sheet 5 is fed into the recording system 1 through a slit 101*a* formed in the main chassis 101. The fed recording sheet 5 is pinched between the sheet feed roller 10 and a needle roller 14 (FIG. 5) which will be described later, and is fed to a recording portion 26*a* of the recording system 1 by a pushing force from the automatic sheet supplying apparatus 100 and the rotational forces of the sheet feed roller 10 and the needle roller 14.

A sheet supply tray 104 is snappingly attached to a main frame 103, and a pressure plate 105 is attached to the sheet supply tray 104. Further, the pressure plate 105 is always biased toward the sheet supply rollers by means of a coil spring (not shown), and the recording sheets 5 interposed between the pressure plate 105 and the sheet supply rollers are supplied by rotating the sheet supply rollers. A sheet guide 106 can be moved transversely by an operator so as to prevent the recording sheet 5 from shifting in the transverse direction. A sheet support form 107 acts to support the recording sheets 5 so that the recording sheets are prevented from falling down from their own weights. A lock gripper 108 is formed integrally with hooks 108*a*, so that when the lock gripper 108 is pulled forwardly the hooks 108*a* are engaged with corresponding square holes 2*d* formed in the recording system 1, thereby locking the recording system 1 to the automatic sheet supplying apparatus 100.

Incidentally, the locking force is obtained by a hook spring (not shown). Further, when the recording system 1 is connected to the automatic sheet supplying apparatus 100, they are properly positioned by fitting the dowel 101*b* of the main chassis 101 into the hole 2*b* of the lower case 2 of the recording system 1 and by fitting a U-shaped projection 101*c* of the main chassis 101 into a U-shaped recess 2*e* of the lower case 2. Further, by abutting the dowel 101*b* against the dowel 9*a*, when the recording system is connected to the automatic sheet supplying apparatus, a distance between them is maintained constantly. Incidentally, in this condition, the hooks 108*a* of the automatic sheet supplying apparatus 100 are fitted into the square holes 2*d* of the lower case 2, as shown in FIG. 3. The dowels 9*a*, 9*b* are formed on a chassis 27 and extend within the holes 2*b*, 2*e* half way.

When the recording system and the automatic sheet supplying apparatus are connected to each other, it is necessary to provide a common guide for them until they reach the positioning positions, according to the present invention, such function can be attained as follows. As mentioned above, the lower case 2 of the recording system 1 has the L-shaped structure, and the circuit board 29 (FIG. 10) is installed on a bottom surface 2*c*, and the circuit board cover 8 is snappingly attached thereon. Further, side surfaces 8*a* of the circuit board cover 8 are guided horizontally along side surfaces 101*d* (FIG. 4A) of the main chassis 101 of the automatic sheet supplying apparatus 100, and a rear projection constituted by the circuit board cover 8 of the ink jet recording system 1 is accommodated into a space defined by the main chassis 101 and a bottom frame 109. In this case, the guiding at upper and lower sides is attained by contacting a bottom surface 2*c* of the lower case 2 of the rear projection (leg) 8A and an upper surface 8*c* of the circuit board cover 8 of the ink jet recording system 1 with ribs 109*a* of the bottom frame 109 and a lower surface 101*e* of the main chassis 101 of the automatic sheet supplying apparatus, respectively.

Incidentally, when the recording system is being connected to the automatic sheet supplying apparatus, since the sliding resistance is increased if rubber feet 8*f* (FIG. 20), formed on the bottom surface 2*c* of the lower case 2, are contacted with an upper surface 109*b* of the bottom frame 109, the ribs 109*a* of the bottom frame 109 are higher than a thickness of each rubber foot 8*f*.

Further, in order to improve the connecting ability between the recording system and the automatic sheet supplying apparatus, the following arrangement is adopted. That is to say, since upper surfaces of the square holes 2*d* of the lower case 2 are slid on upper surfaces of the hooks 108*a* of the automatic sheet supplying apparatus 100 and the upper surfaces of the hooks 108*a* are inclined to ascend upwardly toward the automatic sheet supplying apparatus 100, the positioning members will gradually approach each other. Further, since both positioning members, i.e., the holes 2*b*, 2*e* of the ink jet recording system 1 and the dowels 101*b*, 101*c* of the automatic sheet supplying apparatus 100 are chamfered, during the connection, the relative sliding movement between the square holes 2*d* and the hooks 108*a* is translated into the relative sliding movement between the positioning members, and, finally, the recording system is connected to the sheet supplying apparatus only by the positioning members.

In this case, the rubber feet of the lower case 2 are floated above the surfaces of the rib 109*a* of the bottom frame 109 by about 2 mm. Accordingly, since the recording system 1 is positioned with respect to the automatic sheet supplying apparatus 100 while floating above the latter by about 2 mm, the positioning accuracy can be improved.

Further, since the positioning during the connection is effected near a position where the recording sheet 5 is shifted from the automatic sheet supplying apparatus to the recording system, i.e., the sheet supply inlet 2*a* of the lower case 2 and the slit 101*a* of the main chassis 101, the reliability of the sheet supply will be considerably improved. Of course, since the positioning means are disposed near the gears 10*a*, 102 of both systems, the blacklash in the gears can easily be controlled, thus improving the sheet supplying accuracy.

With the arrangements as mentioned above, the ink jet recording system 1 can easily be connected to the automatic sheet supplying apparatus 100, the sheet supplying ability including the feeding accuracy is improved, and the connecting space is greatly saved since the rear projection of the recording system is accommodated within the automatic sheet supplying apparatus 100. Incidentally, in the illustrated embodiment, sides of both systems are inclined with respect to the vertical plane by about 5 degrees. Further, since the rear projection 8A also acts as the foot for standing the system 1, the recording system 1 can stably be installed in the standing condition.

Next, the internal construction of the ink jet recording system 1 will be explained.

Figure 5:
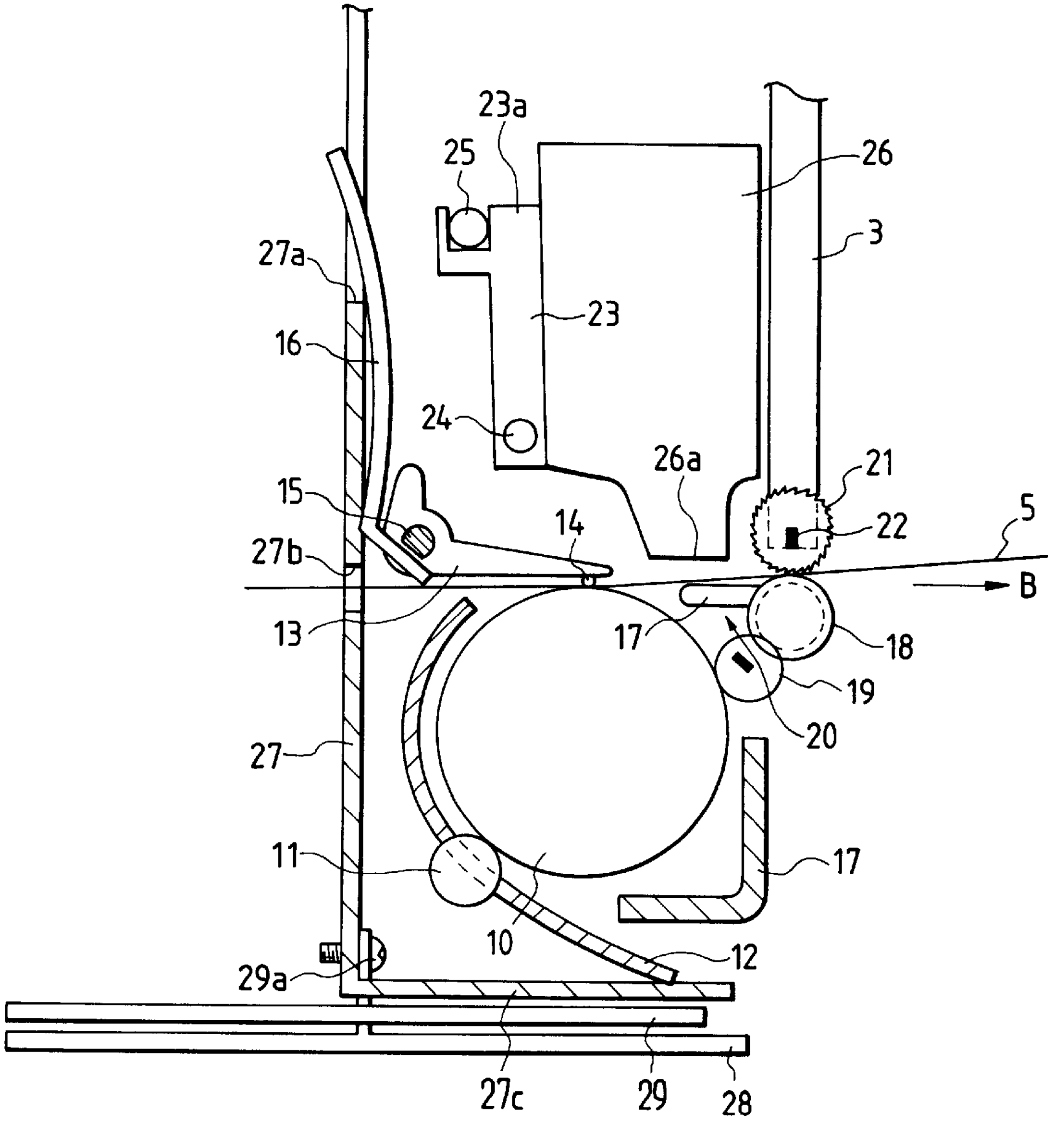
FIG. 5 is a sectional side elevational view of the recording system.

In FIG. 5 showing the internal construction of the ink jet recording system 1, the sheet feed roller 10 is rotated by a sheet feed motor (not shown) at a reduced speed. The gear 10*a* disposed at the end of the sheet feed roller 10 is engaged by the transmission gear 102 of the automatic sheet supplying apparatus 100, thus permitting the operation of the automatic sheet supplying apparatus 100. Further, a pinch roller 11 acts to urge the recording sheet 5 against the sheet feed roller 10, and a guide 12 is provided for guiding the recording sheet 5 to the sheet feed roller 10. The needle rollers 14 are snappingly attached to a holder 13. Incidentally, four needle rollers 14 are arranged along a direction transverse to a sheet feeding path. Further, a D-shaped shaft 15 is fitted into the holder 13, so that when the release lever 7 is pulled forwardly the D-shaped shaft 15 is rotated, thus releasing a biasing force of a pressure spring 16 to the holder 13. Thus, the abutment of the needle rollers 14 against the sheet feed roller 10 can be released. In this case, the pinch roller 11 is also released by a predetermined mechanism.

A platen 17 rotatably supports an ejector roller 18 which maintains its rotation shaft non-shiftable, and an idle roller 19 which maintains its rotation shaft shiftable. As shown, the idle roller 19 is pinched between the sheet feed roller 10 and the ejector roller 18 and is urged against these rollers by means of an idle roller spring 20 incorporated within the platen 17. A movable spur 21 is rotatably mounted on a lower end of the upper cover 3, which spur is urged against the ejector roller 18 with an appropriate pressure by means of a spur spring 22 incorporated within the upper cover 3. Since the movable spur 21 feeds the recording sheet 5 while contacting with the latter, the spur has sharp edge teeth so that the recording sheet is not smeared with the ink transferred to the recording sheet. Incidentally, the recording sheet 5 is pinched between the sheet feed roller 10 and the needle rollers 14 and is also pinched between the ejector roller 18 and the movable spur 21 to be fed to a direction shown by the arrow B.

A carrier 23 slidably mounted on a carrier shaft 24 can be shifted in a direction perpendicular to a plane of FIG. 5 by an appropriate means (not shown). A carrier guide shaft 25 prevents the rotation of the carrier 23 and extends parallel to the carrier shaft 24. Incidentally, when a lever 31 (described below) is operated, the carrier guide shaft 25 is rotated because of the eccentric relation between a carrier engaging portion and a shaft end portion, with the result that an upper portion 23*a* of the carrier is rocked around the carrier shaft 24, thereby changing a distance between a nozzle surface (discharge opening surface) 26*a* of an ink jet recording head 26 mounted on the carrier 23 and the recording sheet 5.

In this way, even when the thickness of the recording sheet 5 is increased by the shrinkage in the recording sheet 5 due to the ink or a thicker recording sheet such as an envelope is used, the nozzle 26*a* does not contact the recording sheet 5, thus preventing the deterioration of the recorded image due to a sliding contact between the nozzle 26*a* and the recording sheet 5. Further, the chassis 27 serves to support the whole sheet feeding mechanism as mentioned above and has a notch 27*a* into which the pressure spring 16 is fitted, so that the spring is deformed to provide the urging force to the holder 13. A passage slit 27*b* is formed in the chassis 27 in confronting relation to the sheet supply inlet 2*a* of the lower case 2. The chassis 27 having the passage slit 27*b* has an L-shaped cross-section. A shield plate 28 is integrally secured to the chassis 27 by pins 29*a* and is also electrically connected to the latter. The shield plate 28 is electroplated with melt zinc to enhance its shielding ability, and a circuit board 29 is interposed between the shield plate 28 and a bent portion 27*c* of the chassis 27 to enhance the shielding ability regarding the circuit board 29. Thus, an electromagnetic wave is prevented from reaching the circuit board 29 and the electromagnetic wave is prevented from escaping from the circuit board 29.

Further, since the ink jet recording head 26 is mounted at an upper position, if a large amount of ink is discharged from the recording head for some reason when the recording sheet 5 is not supplied, it is feared that the ink flows downwardly. Further, although waste ink sucked from the ink jet recording head 26 by means of an appropriate head recovery mechanism (not shown) is exhausted into the sheet feed roller 10, if the waste ink is leaked for some reason, it is also feared that the ink flows downwardly. In such cases, since the circuit board 29 is installed at a lower position, if the ink flows onto the circuit board, it is feared that the circuit board will short-circuit. To avoid this, in the illustrated embodiment, the bent portion 27*c* of the chassis 27 is positioned below a recording portion of the recording head 26. Incidentally, an ink absorbing material may be disposed on the bent portion 27*c* to further prevent the above inconvenience.

With this arrangement, since the shield plate 28 is integrally secured to the chassis 27 by the pins 29*a*, the lateral rigidity of the whole system is increased. Incidentally, in the illustrated embodiment, the shield plate 28 extends below the circuit board 29 up to a position directly below the recording portion, thus increasing the strength against the thrust force from the lateral direction of the projection 8A.

Next, the automatic sheet supplying appartus will be fully explained with reference to FIGS. 6 to 15.

Figure 6:
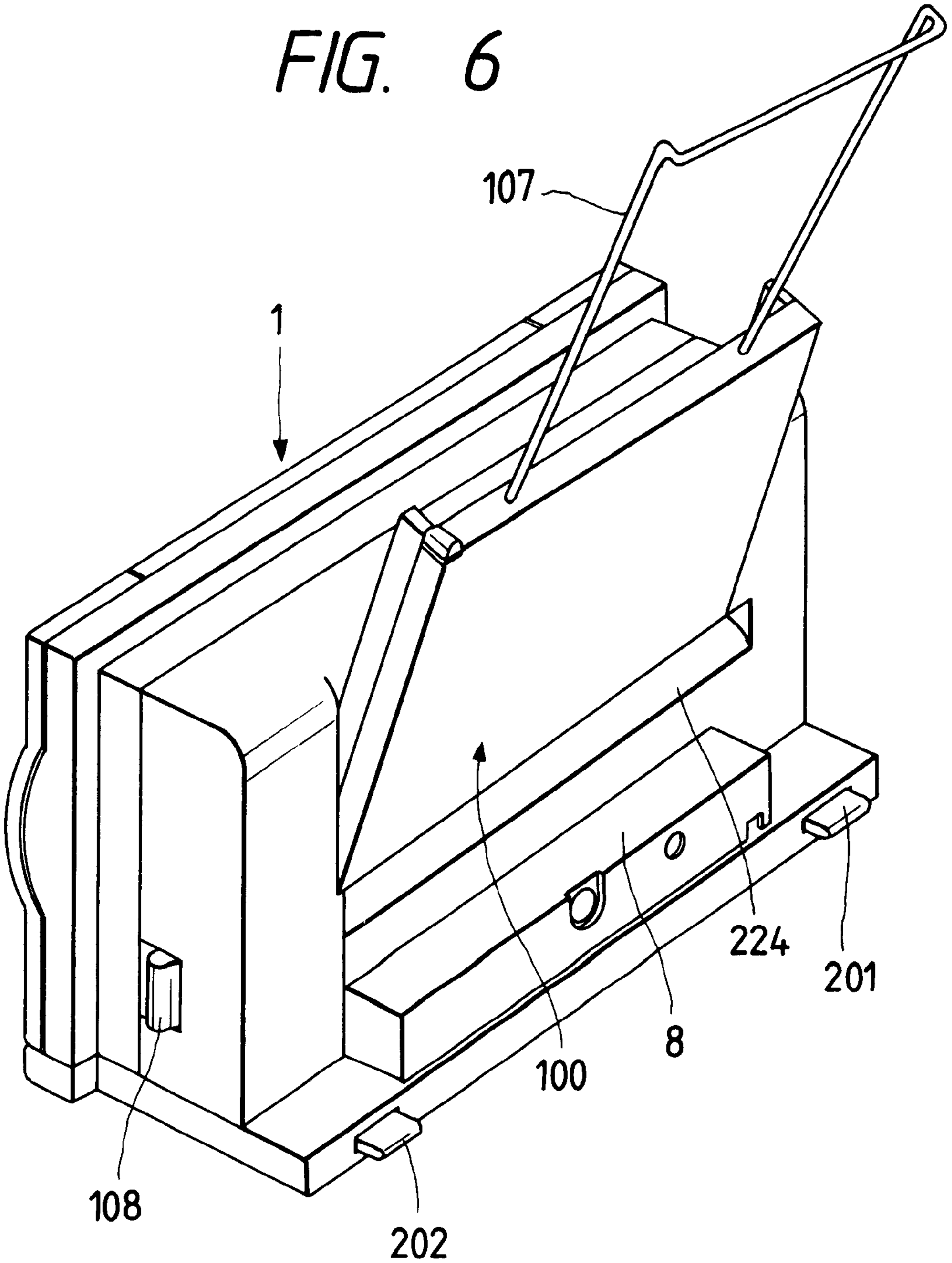
FIG. 6 is a perspective view showing a condition that the recording system is connected to the automatic sheet supplying apparatus.

FIG. 6 is a rear perspective view showing a condition where the recording system 1 is connected to the automatic sheet supplying apparatus 100. In FIG. 6, the reference numeral 224 denotes a sheet supply opening for passing the recording sheet when the latter is supplied from the automatic sheet supplying apparatus 100 to the recording system 1.

Figure 7:
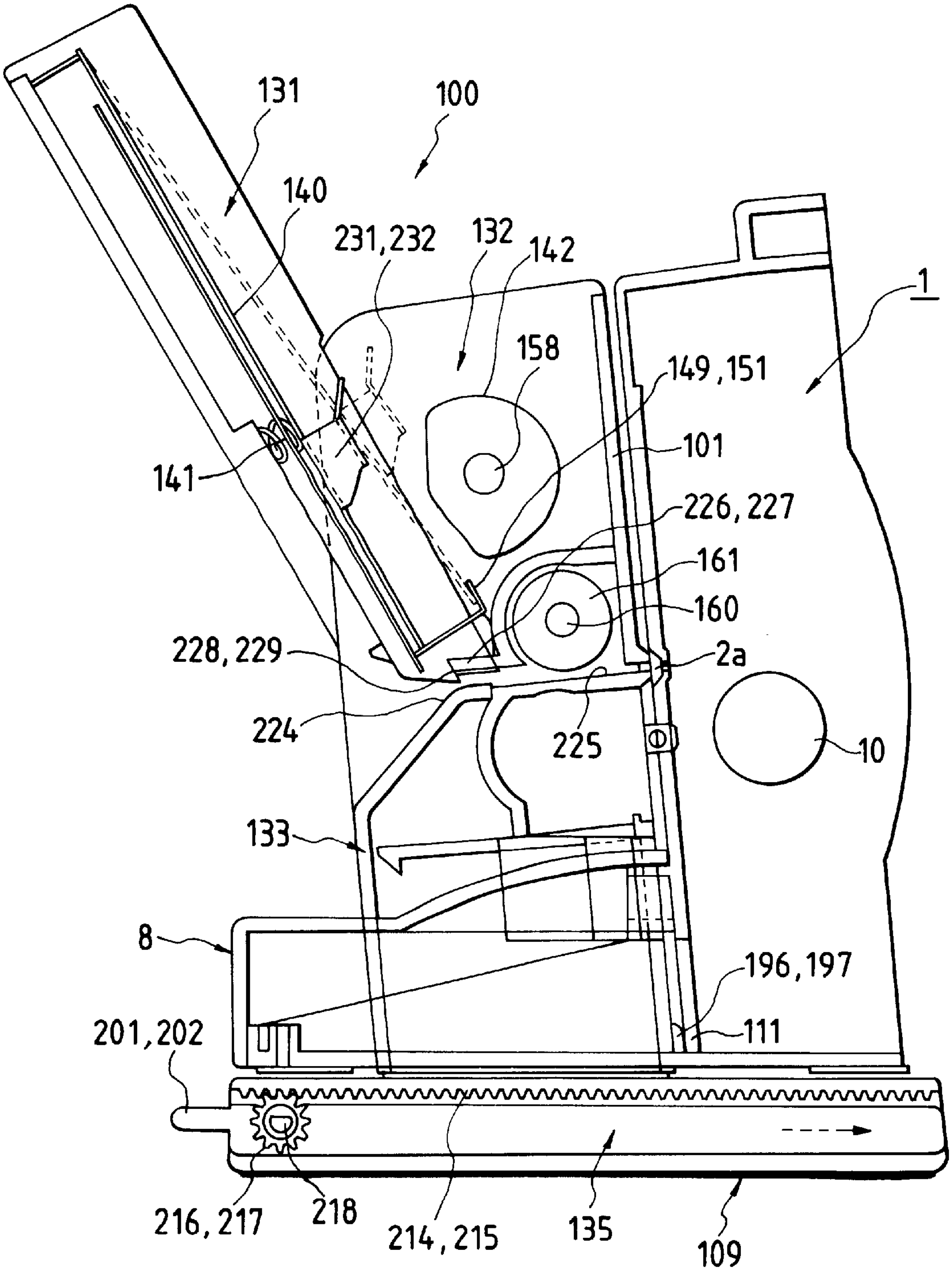
FIG. 7 is a sectional side elevational view of the connected recording system and automatic sheet supplying apparatus.
Figure 8:
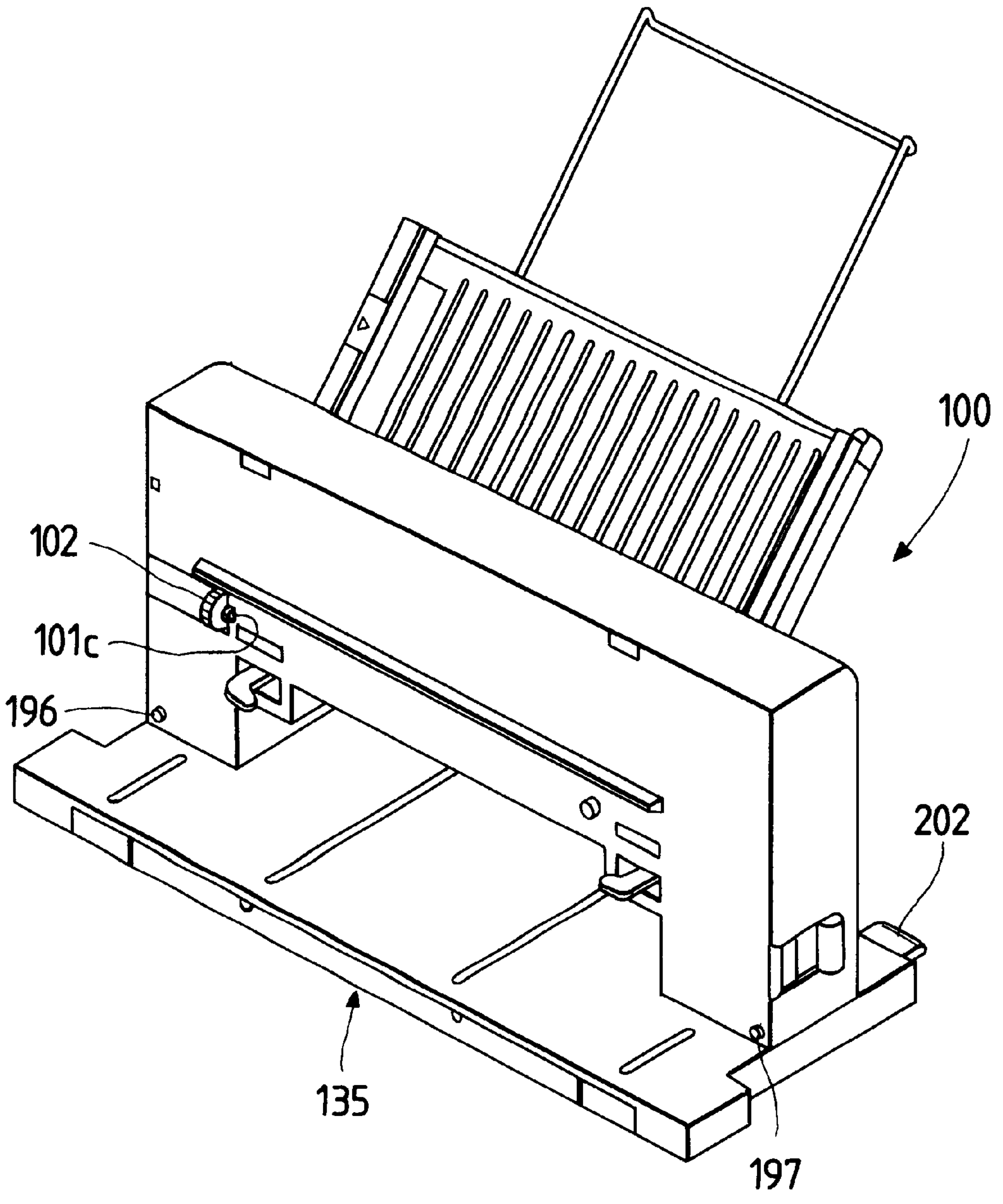
FIG. 8 is a perspective view of the automatic sheet supply apparatus of FIG. 7.
Figure 9:
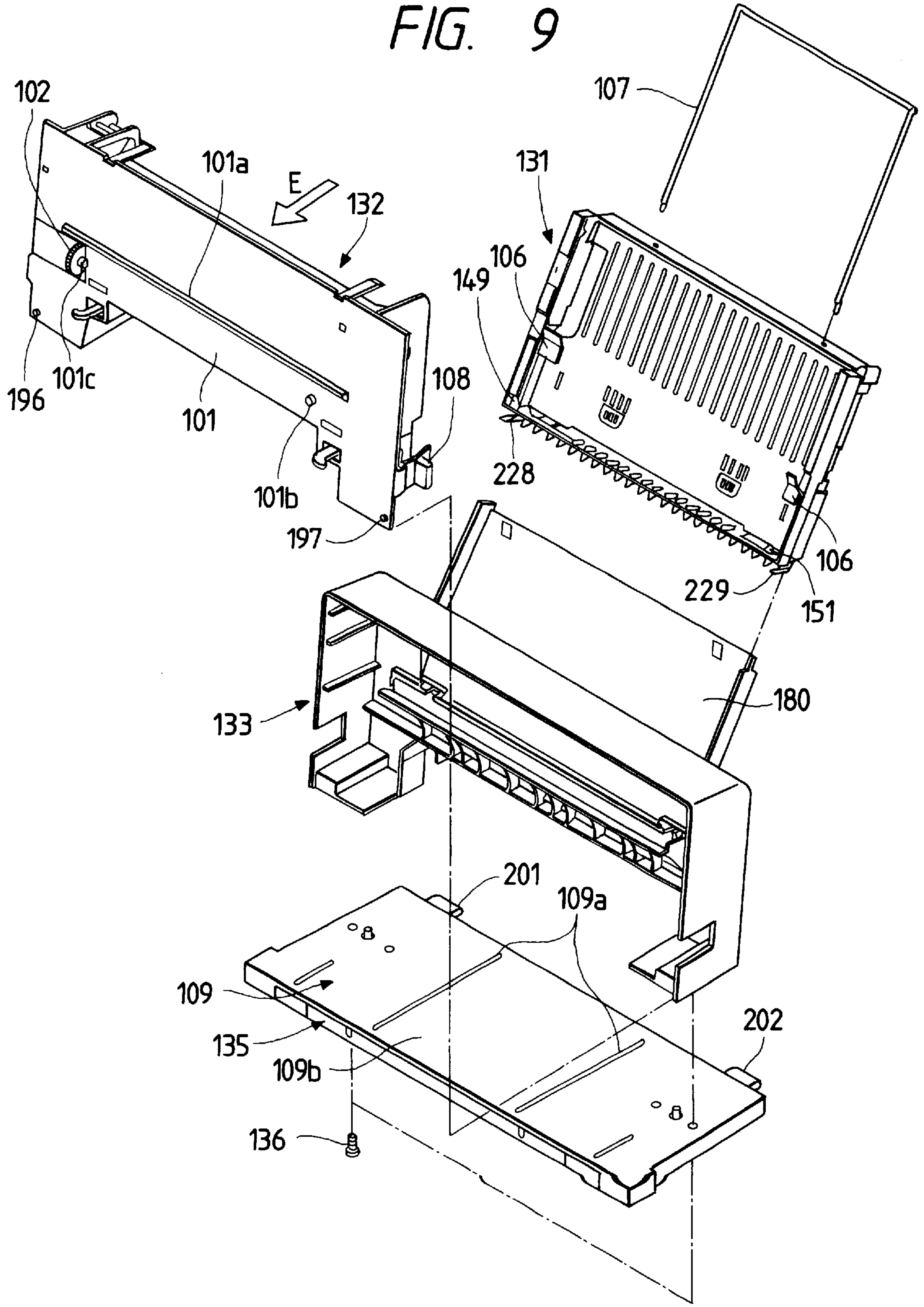
FIG. 9 is an exploded perspective view of the automatic sheet supplying apparatus of FIG. 7.

FIG. 7 is a sectional side view showing main components when the recording system 1 is connected to the automatic sheet supplying apparatus 100. FIG. 8 is a front perspective view of the automatic sheet supplying apparatus 100, and FIG. 9 is an exploded perspective view of the apparatus 100. In FIGS. 8 and 9, the automatic sheet supplying apparatus 100 is briefly grouped into a sheet supply cassette unit 131, a sheet supply drive unit 132, a frame 133 and a support 109. Incidentally, an ejection tray unit 135 is extractably housed within the support 109, and the support 109 also acts as an ejection tray. The frame 133 is secured to an upper surface of the support 109 by two pins 136, and the sheet supply cassette unit 131 and the sheet supply drive unit 132 are snappingly connected to the frame 133. Incidentally, a sheet supply cassette receiving portion 180 is formed on the frame 133 to support the sheet supply cassette unit 131 at a predetermined angle.

Figure 10:
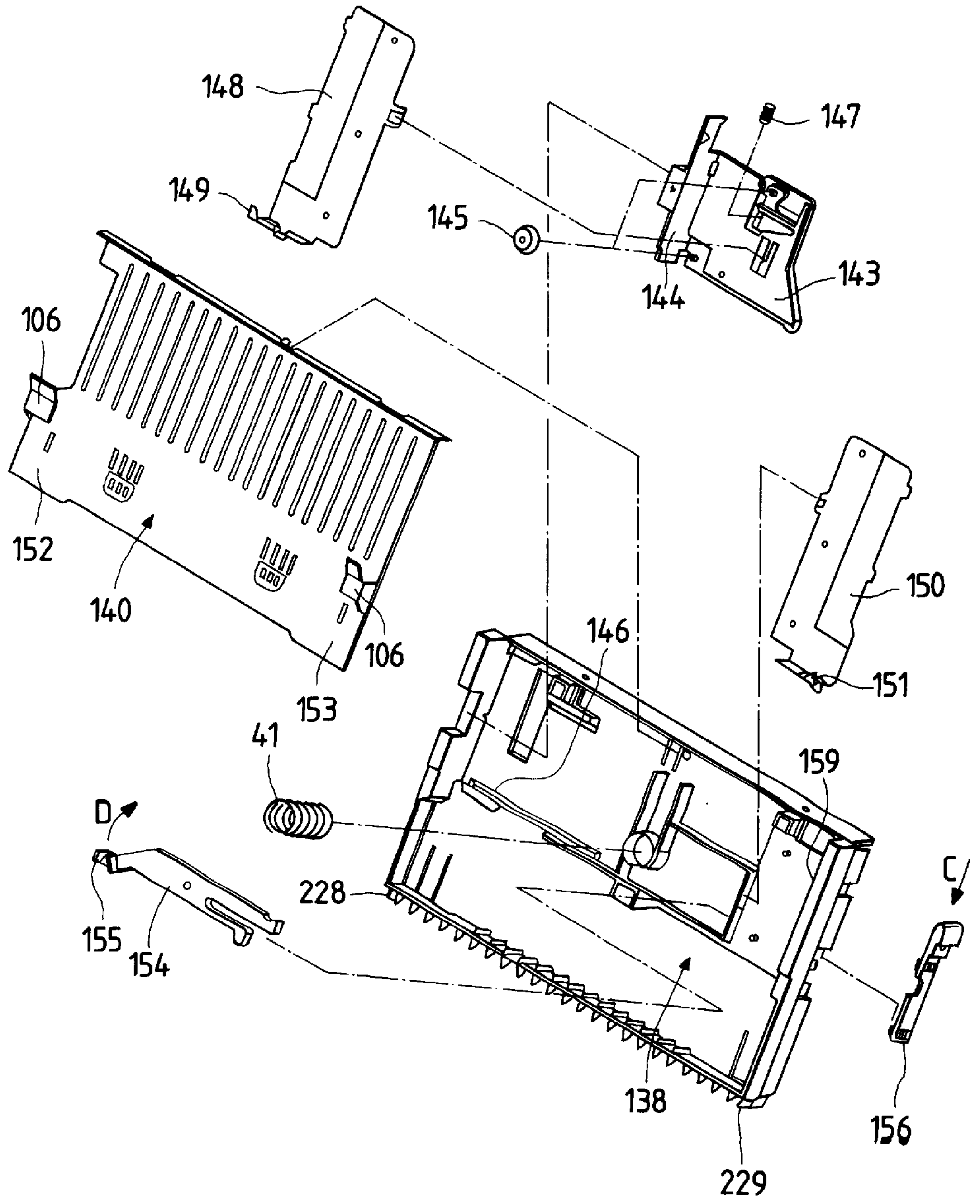
FIG. 10 is an exploded perspective view of a sheet supply cassette unit of the apparatus of FIG. 8.

In FIG. 10 showing an exploded perspective view of the sheet supply cassette unit 131, the sheet supply cassette unit 131 serves to stack and contain recording sheets (cut sheets) 116, and comprises various parts incorporated into a cassette case 138 acting as a base. A pressure plate 140 is always biased toward sheet supply rollers 142 (FIGS. 7 and 11) by means of a pressure plate spring 141. The recording sheets 116 interposed between the pressure plate 140 and the sheet supply rollers 142 are supplied one by one by rotating the sheet supply rollers 142. A slider 143 for guiding one of the lateral edges (sides) of the recording sheets (sheet stack) 116 stacked on the cassette unit is mounted within the cassette case 138 for movement in a direction transverse to the recording sheets.

The slider 143 has a side guide portion 144 which can be abutted against one lateral edge of the sheet stack 116. Further, slide rollers 145 are attached to the slider 143 to smoothly slide the slider. Four slide rollers 145 are arranged in longitudinal and lateral directions at predetermined intervals, and each slide roller is slidably engaged by a corresponding slide guide portion 146 formed on the cassette case 138. In this way, the slider 143 can be shifted to the left-and-right direction to conform the width of the sheet stack 116. In this case, the slide rollers 145 at one side in the longitudinal direction are urged against the slide guide portion 146 by means of a roller pushing coil spring 147, thus absorbing the play of the slider 143 in the longitudinal direction and preventing the slider 143 from being shifted by a weak force after the sheets have been set.

Further, a separating pawl member 148 having a separating pawl 149 is secured to the slider 143. The separating pawl 149 can be shifted together with the slider 143 in accordance with the width of the sheet stack. A side guide portion 159 which cooperates with the shiftable side guide portion 144 is secured to the cassette case 138. Accordingly, in the illustrated embodiment, the both lateral edges of the sheet stack 116 are guided by shifting only one side guide portion. Further, a separating pawl member 150 having another separating pawl 151 is secured to the cassette case 138. The stacked sheets 116 interposed between the pressure plate 140 and the sheet supply rollers 142 are separated and supplied one by one by these two separating pawls 149, 151 when they are supplied by the rotation of the sheet supply rollers 142.

In the absence of the recording sheet, the pressure plate 140 is urged at both its ends 152, 153 against the back surfaces of the separating pawls 149, 151. On the other hand, the sheet stack 116 must be accommodated between the back surfaces of the separating pawls 149, 151 and the pressure plate 140. To this end, the pressure plate 140 can easily be pressed down in opposition to the pressure plate spring 141. When the pressure plate 140 is pressed down, a hook portion (not shown) formed on the back surface of the pressure plate is locked by a hook portion 155 of a pressure plate releasing lever 154, thus maintaining the pressure plate 140 in the pressed condition (lowered condition).

After the recording sheets 116 are set (stacked), in order to return the pressure plate 140 to the sheet supplying condition (i.e., to bias toward the sheet supply roller 142), a pressure plate releasing button 156 is depressed toward a direction shown by the arrow C. When the pressure plate releasing button 156 is depressed, the hook portion 155 of the pressure plate releasing lever 154 is rotated in a direction shown by the arrow D, thus unlocking the pressure plate 140. Incidentally, as shown in FIG. 6, the sheet supporting form 107 is attached to an upper end of the sheet supply cassette unit 131 to prevent the sheet stack 116 from falling down under its own weight.

Figure 11:
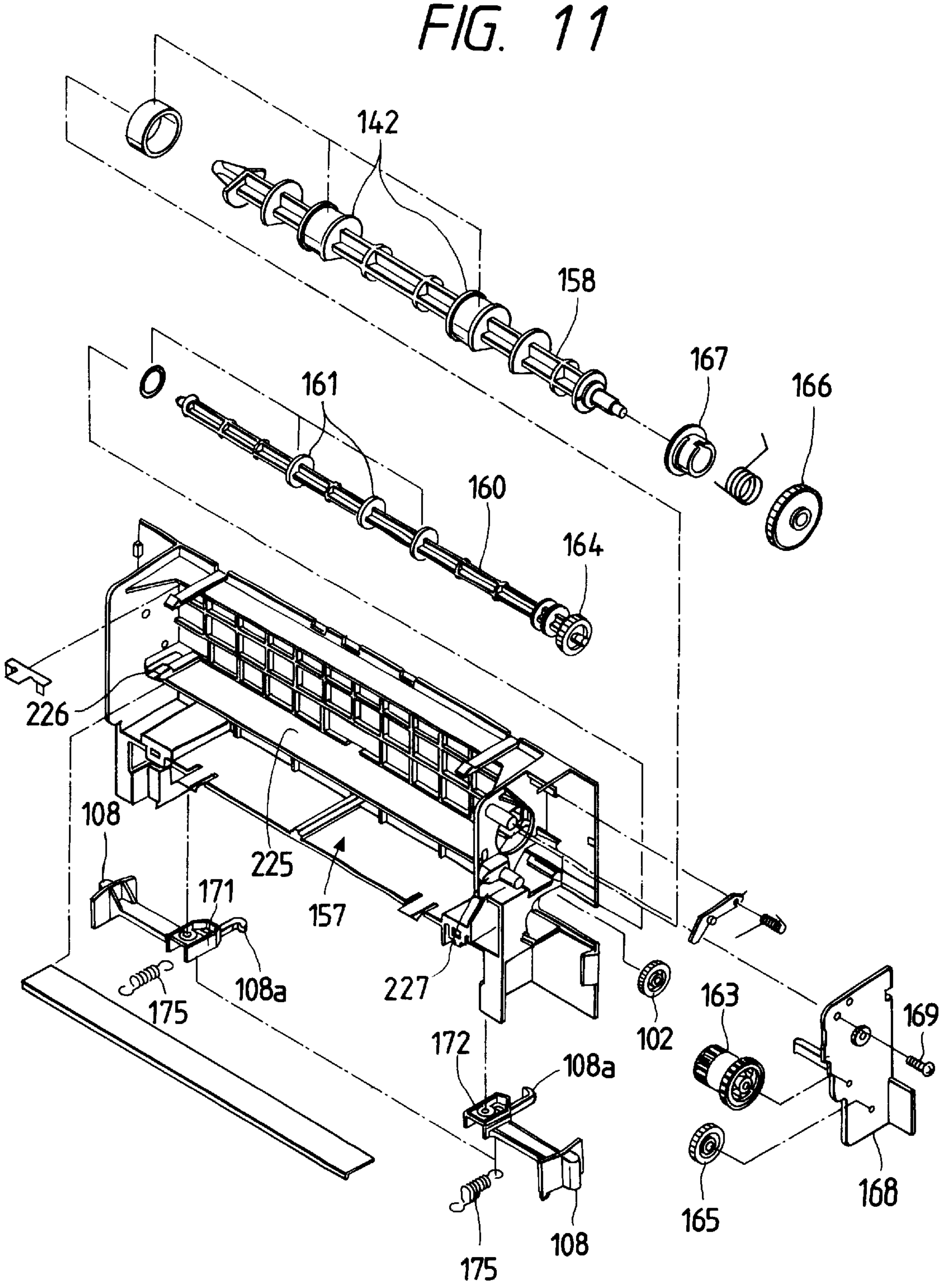
FIG. 11 is an exploded perspective view of a sheet supply drive unit of the apparatus of FIG. 8.

FIG. 11 is an exploded perspective view of the sheet supply drive unit 132 revealing its constructural elements, looked at from a direction (back) shown by the arrow E in FIG. 9. The sheet supply drive unit 132 includes various rollers for supplying the recording sheet 116, various hooks for connecting the unit to the recording system 1, various gears for transmitting the driving force from the recording system 1 to the automatic sheet supplying apparatus 100 and the like. And, the constructural elements are incorporated within a chassis 157 acting as a base.

In FIG. 11, a plurality of sheet supply rollers 142 are mounted on a sheet supply roller shaft 158. The sheet supply rollers 142 give the sheet feeding force to the stacked recording sheets 116 and cooperate with the separating pawls to separate the recording sheets 116 one by one and to supply the sheets one by one into the recording system 1. The sheet supply roller shaft 158 is driven by using the driving force of the drive gear 10*a* (FIG. 3) of the recording system 1.

In FIG. 11, a plurality of sliding contact rollers 161 are mounted on a sliding contact roller shaft 160. The sliding contact roller shaft 160 is disposed at a downstream side of the sheet supply roller shaft 158 in the recording sheet feeding direction and parallel to the shaft 158. The sliding contact rollers 161 serve to guide the recording sheet 116 supplied by the sheet supply rollers 142 into the recording system 1. Further, the sliding contact rollers 161 are also driven by the driving force of the drive gear 10*a* of the recording system 1.

The driving force of the drive gear 10*a* of the recording system 1 is firstly transmitted to the transmission gear 102 (FIG. 8) of the automatic sheet supplying apparatus 100. In FIG. 11, the driving force transmitted to the transmission gear 102 is transmitted to a sliding contact roller gear 164 of the sliding contact roller shaft 160 via an intermediate gear 163, and is then transmitted to a sheet supply roller gear 166 mounted coaxially with the sheet supply roller shaft 158 via an intermediate gear 165. The sheet supply roller gear 166 mounted coaxially with the sheet supply roller shaft 158 is connected to the sheet supply roller shaft 158 via a one-way clutch (for example, a spring clutch) 167.

The one-way clutch 167 is so designed that it is always in a clutch-off condition in a reverse direction and it is ON/OFF controlled even in a normal direction. For example, as the one-way clutch 167, the following one is used. That is to say, first of all, when a geer roller (platen roller) (not shown) of the recording system 1 is rotated by a small amount in a reverse direction (opposite to the sheet feeding direction) in response to a sheet supply signal, the one-way clutch 167 is turned ON by the reverse rotation (clutch trigger) of the sheet supply roller gear 166. In this condition, by the normal rotation of the feed roller, the normal rotation of the sheet supply rollers 142 is permitted. In this case, the sheet supply rollers 142 each including a D-shaped (semi-cylindrical) or unequal-sided body are situated in reference positions (initial position) spaced apart from the sheet stack 116.

Then, when the feed roller is rotated normally by a predetermined amount, the sheet supply rollers 142 are rotated synchronous with the feed roller, thus supplying one recording sheet 116 up to a position exceeding a nip portion of the feed roller. The recording sheet 116 reaches the nip portion and is detected by a sensor, and a stop position of the feed roller is controlled by a detection signal from the sensor. Then, the feed roller is rotated by a predetermined amount to retard a leading end of the recording sheet 116 to a position where the leading end of the sheet is out of the nip. Then, by rotating the feed roller reversely, a loop is formed in the leading end portion of the recording sheet, thus correcting the skew-feed of the sheet (to make the leading end of the sheet parallel with the feed roller).

The one-way clutch (for example, spring clutch) 167 is still in the clutch-on condition by the clutch trigger, so that the rotation can be transmitted to the normal direction. Now, the feed roller is rotated in the normal direction by a predetermined amount. By the normal rotations of the feed roller and the sheet supply rollers 142, the recording sheet 116 is sent to a record starting position (heading position). During such normal rotations, when the D-shaped sheet supply rollers 142 are separated from the recording sheet 116, i.e., when the sheet supply rollers 142 return to their reference positions (initial positions) after their one revolutions, the one-way clutch 167 is turned OFF, thus stopping the sheet supply rollers 142 at the reference positions.

In this way, during one revolution of each sheet supply roller 142, only one recording sheet 116 is supplied to the recording system 1 and is set to the heading condition. Thereafter, an image is recorded on the recording sheet 116 in response to image information. During the recording, the one-way clutch 167 is maintained in the clutch-off condition; thus, the sheet supply rollers 142 are still stopped at the reference positions, regardless of the normal rotation (sheet feeding rotation).

In FIG. 11, the above-mentioned gears 102, 163, 164, 165, 166 and the roller shaft 158, 160, are positioned and held by a bearing plate 168 so that they are not disassembled. The bearing plate 168 is snappingly attached to the chassis 157 and is secured by a pin 169.

The hooks 108*a* for connecting to the recording system 1 are formed on ends of hook members 171, 172 which are disposed symmetrically on both sides of the chassis 101, and are mounted for rocking movement and for shifting movement in the front and rear direction by a predetermined amount. Each hook member 171, 172 is biased inwardly by means of a tension spring 175, so that it provides a predetermined urging force when connected to the recording system 1. Further, an operation portion 108 extending outwardly is formed on the other end of each hook member 171, 172, and, the recording system 1 can be connected to or disconnected from the automatic sheet supplying apparatus 100 by manipulating such operation portions 108.

In FIG. 9, the ejection tray unit 135 is extractably housed in a lower cavity in the support 109. When the automatic sheet supplying apparatus 100 is used, by extracting the ejection tray unit 135 forwardly, it is possible to stock the recording sheets, on each of which the image was recorded, on the ejection tray unit. Further, the frame 133 is secured to the upper surface of the support 109 by means of screws 136, and the sheet supply cassette unit 131 and the sheet supply drive unit 132 are snappingly positioned and mounted on the frame 133. Thus, the automatic sheet supplying apparatus 100 is designed so that each unit thereof can be mounted on the support 109 and frame 133 and so that it can stably stand on its own bottom.

Figure 13:
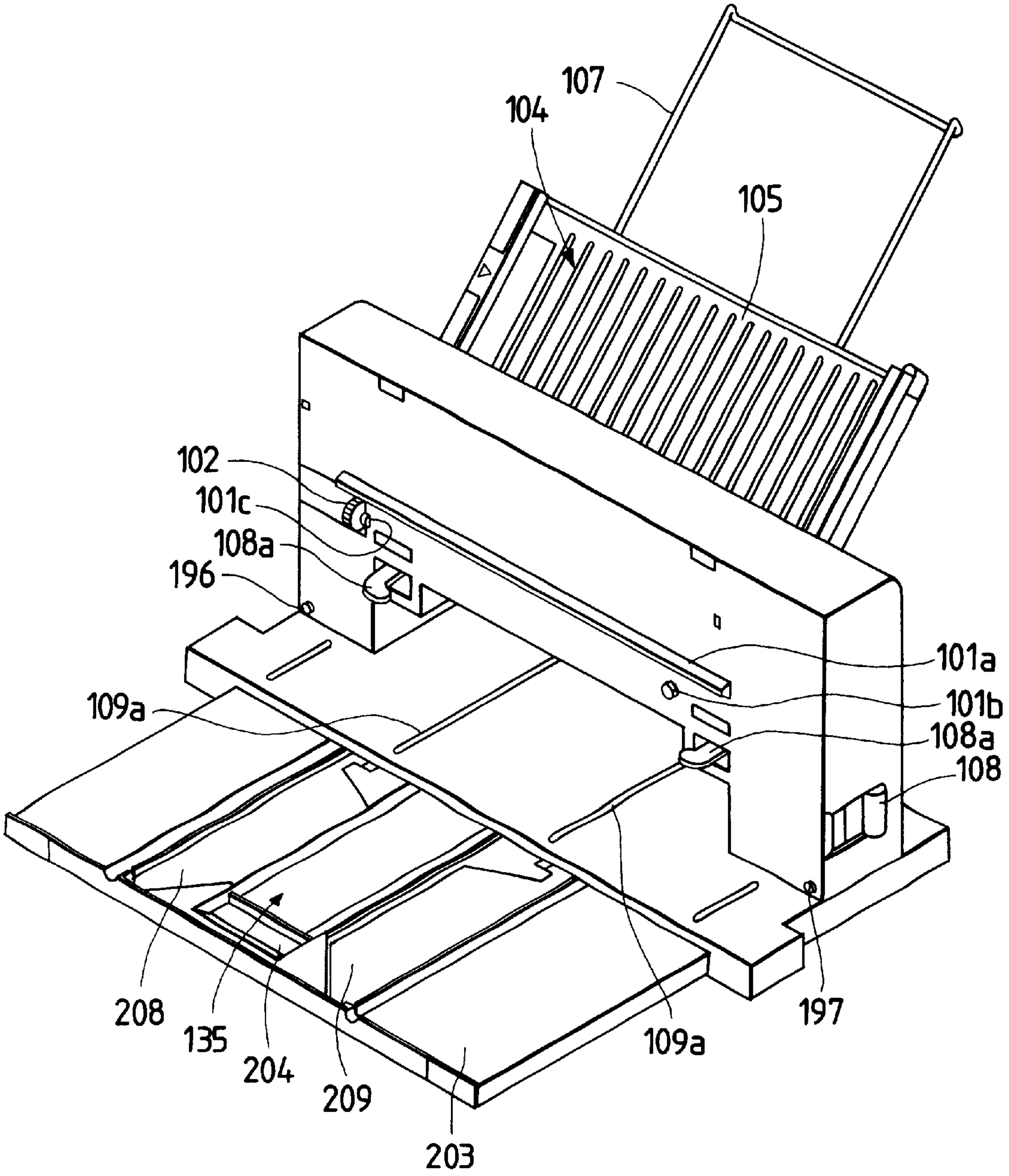
FIG. 13 is a perspective view of the automatic sheet supplying apparatus showing a condition that the ejection tray unit is extracted half way.
Figure 14:
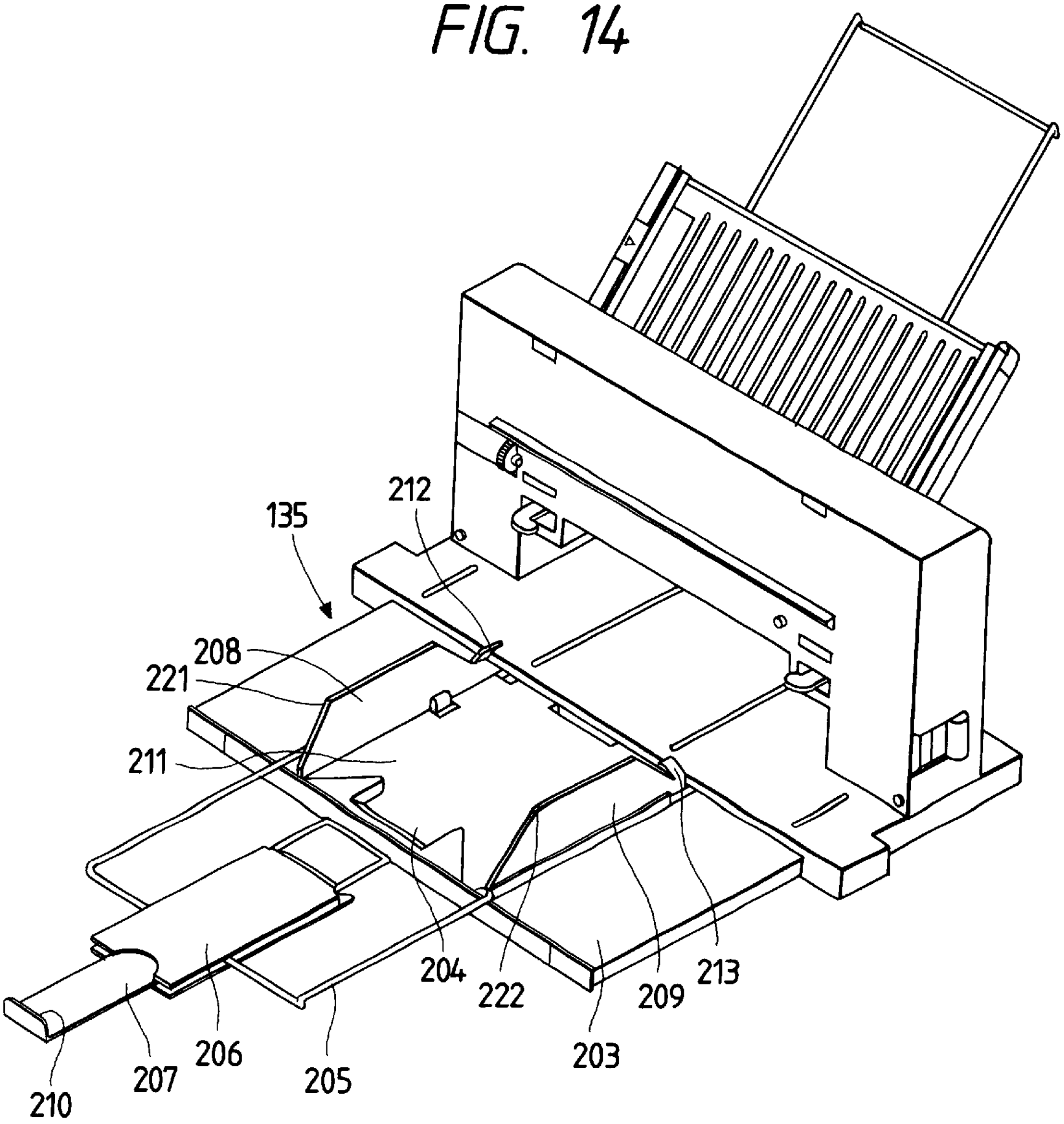
FIG. 14 is a perspective view of the automatic sheet supplying apparatus showing a condition that the ejection tray unit is extracted completely.
Figure 15:
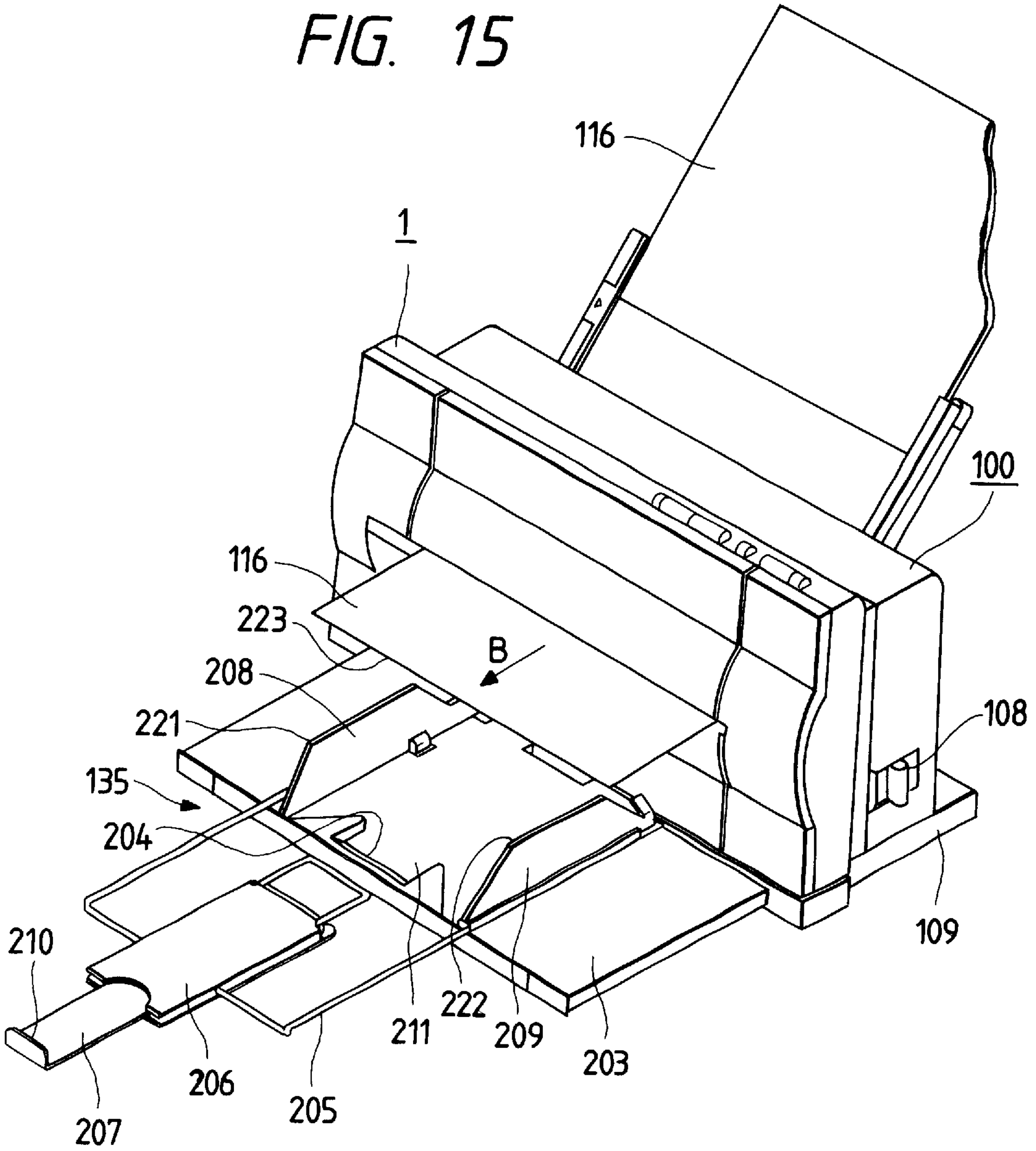
FIG. 15 is a perspective view of the automatic sheet supplying apparatus to which the recording system is connected, showing a condition that the ejection tray unit is extracted completely.

As shown in FIGS. 8 and 9, the automatic sheet supplying apparatus 100 has an integral structure wherein the sheet supply cassette unit 131 and the sheet supply drive unit 132 are attached to the platform support 109 via the frame 133 and has a substantially L-shaped or inverted T-shaped cross-section so that it can be stably installed by oneself. Further, since the ejection tray unit 135 is extractably housed in the support 109, the installation space can be greatly reduced. FIG. 8 shows a condition that the ejection tray unit 135 is retracted into the support, FIG. 13 shows a condition that the ejection tray 135 is extracted half way, FIG. 14 shows a condition that the ejection tray unit 135 is extracted completely for use, and FIG. 15 shows a condition that after the automatic sheet supplying apparatus is connected to the recording system 1 the ejection tray unit 135 is extracted completely.

Figure 12:
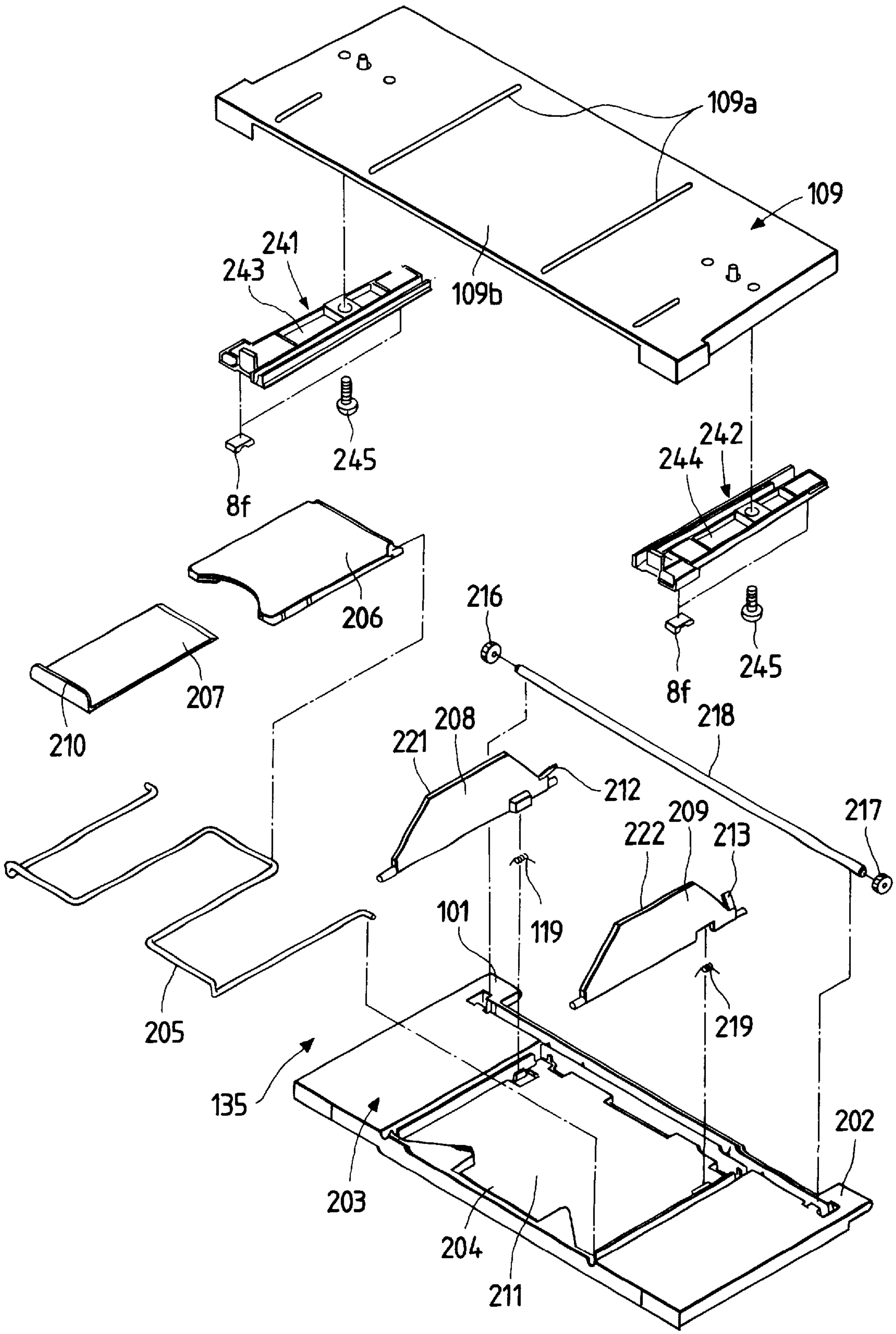
FIG. 12 is an exploded perspective view of a support and ejection tray unit of the apparatus of FIG. 8.

FIG. 12 is an exploded perspective view showing the detailed construction of the ejection tray unit 135. In FIG. 12, the ejection tray unit 135 is so designed that various tray constituting elements are foldably attached to an ejection tray 203 acting as a base. In a folded condition, projections 201, 202 protruding from the rear surface of the support 109 are formed on both sides of the rear end of the ejection tray 203 (FIGS. 6 to 9). In use, when the tray is desired to be extracted, an operator pushes either one of the two projections 201, 202 to push out the ejection tray 203 forwardly to some extent. Then, he grips a cavity 204 of the protruded ejection tray 203 and pulls it forwardly until he feels "click" and the tray is stopped. This condition is shown in FIG. 13.

In FIG. 12, seat portions 241, 242 are formed on both left and right sides on the bottom surface of the support 109. These seat portions 241, 242 are constituted by tray guides 243, 244, respectively, which are secured to the bottom surface of the support 109 by means of screws 245. Further, rubber foots **8*f* are adhered to bottom surfaces of the tray guides 243, 244 to prevent the vibration and slip when the automatic sheet supplying apparatus 100 is installed. The tray guides 243, 244 act as guide members for guiding the lower surface of the ejection tray 203** when the latter is extracted or retracted and have a function to prevent the ejection tray from detaching from the support.

In FIGS. 12 to 15, a rockable and foldable ejection sheet support 205 made of a wire is attached to a front end of the ejection tray 203. Two-stage slidable sheet stoppers 206, 207 are attached to the ejection sheet support 205 for extracting and retracting movement in the sheet ejecting direction. An abutment portion 210 for regulating the position of the leading end of the ejected recording sheet 116 is formed on the forward end of the forward sheet stopper 207.

Further, two left and right sub-plates 208, 209 are mounted on the ejection tray 203 for rocking movement between a folded position and a cocked position. These sub-plates 208, 209 are rotatably-mounted at their front and rear end shafts on the ejection tray 203 and are biased toward their cocked positions by means of springs 219 mounted on the ejection tray 203.

After the ejection tray 203 is extracted to the position shown in FIG. 13, when the ejection sheet support 205 is rotated upwardly, the left and right sub-plates 208, 209 are automatically rotated (opened) to the cocked positions shown in FIG. 14 by biasing forces of the springs 219. Incidentally, by cocking these sub-plates 208, 209 substantially vertically, these sub-plates act as stoppers for preventing the ejection tray 203 from being retracted into the support 109.

The ejection sheet support 205 is rotated about 180 degrees up to an open position (FIG. 14) where the ejection sheet support is parallel to the ejection tray 203. Then, the sheet stoppers 206, 207 having the two-stage slide mechanism are extracted from the ejection sheet support 205, thus preparing the usable condition as shown in FIGS. 14 and 15.

In this case, the first-stage sheet stopper 206 can be extracted until the stopper mechanism is operated; whereas, the second-stage sheet stopper 207 has click mechanisms for preventing the discrepancy in position in correspondence to the size of the recording sheet 116 and thus can be extracted to predetermined extended positions. The size of the recording sheet may be, for example, letter size, A4 size, B5 size, legal size or the like, and the click mechanisms are provided at positions corresponding to these sheet sizes, and marks are provided for indicating the respective extracted positions corresponding to the sheet sizes.

In the usable condition that the automatic sheet supplying apparatus is connected to the recording system 1 as shown in FIG. 15, the recording sheet 116 ejected from the recording system 1 in the direction shown by the arrow B is ejected while contacting the back surface thereof with upper ends 221, 222 of the sub-plates 208, 209. In this case, the height of the ejected recording sheet 116 is regulated by the heights of the sub-plates 208, 209.

Incidentally, when the position of each sub-plate 208, 209 is adjustable in a sheet width direction, if the regulation for the height of the ejected recording sheet is not required depending upon the kind of the recording sheet, by shifting the sub-plates 208, 209 to the positions corresponding to the width of the recording sheet, the sub-plates can be used as side guide members for preventing the discrepancy in position of the recording sheet 116 in the sheet width direction. When the recording sheet 116 is ejected from the recording system 1 completely, the leading end 223 of the recording sheet 116 is abutted against the abutment portion 210 of the sheet stopper 207, thus regulating the position of the recording sheet 116 in the sheet ejecting direction.

As mentioned above, by providing the sub-plates 208, 209 and the sheet stoppers 206, 207, it is possible to properly adjust (regulate) the height of the ejected recording sheet, the sheet width direction and the sheet ejecting direction (sheet advancing direction) in accordance with the kind of the recording sheet, and to improve the registration of the recording sheets and the sheet ejecting ability.

When the ejection tray unit 135 is retracted from the usable condition (extracted condition) shown in FIGS. 14 and 15, first of all, the sheet stoppers 206, 207 are slidingly pushed into the ejection sheet support 205. Then, the ejection sheet support 205 is rotated to be folded onto the ejection tray 203. The sub-plates 208, 209 have projections 212, 213 (FIGS. 12 and 14) engageable by the ejection sheet support 205.

Accordingly, when the ejection sheet support 205 is rotated upwardly, the ejection sheet support 205 is abutted against the projections 212, 213, and, then, by further rotating the ejection sheet support 205 up to about 180 degrees while being abutted against the projections, the ejection sheet support 205 and the sub-plates 208, 209 are folded (fallen) into the cavity 211 of the ejection tray 203 simultaneously. This condition is the same as that shown in FIG. 13, and, at the same time, the stopper for the ejection tray 203 in the retracted direction is released, with the result that the ejection tray 203 can be slid into the support 109. Accordingly, by retracting the ejection tray into the support, the ejection tray unit 135 is housed in the support 109, thus restoring the retracted condition as shown in FIGS. 8 and 9.

In FIG. 7, rack gears 214, 215 extending to a sliding direction (retracting and extracting direction) of the ejection tray unit 135 are disposed on both left and right sides (in the sheet width direction) on the bottom surface (side on which the ejection tray unit 135 is housed) of the support 109. The rack gears 214, 215 can be secured to the support as discrete members, or may be integrally formed with the support 109. On the other hand, as shown in FIGS. 7 and 12, a shaft 218 extending to the sheet width direction is rotatably mounted on the ejection tray unit 135, and gears 216, 217 meshed with the rack gears 214, 215 are secured to both ends of the shaft 218.

Thus, when the ejection tray unit 135 is extracted or retracted with respect to the support 109, the gears 216, 217 are rolled on the rack gears 214, 215. With this arrangement, it is possible to improve the left and right balance when the ejection tray unit 135 is retracted or extracted, and, thus, it is possible to prevent the non-smooth operation due to the biting when it is retracted or extracted and to easily and smoothly retract and extract the ejection tray unit 135, thereby improving the operability.

In the automatic sheet supplying apparatus 100, the sheet supply cassette unit 131 acts to stack the recording sheets thereon, and the sheet supply drive unit 132 serves to separate the recording sheets one by one and to supply the recording sheet to the recording system 1. The automatic sheet supplying apparatus 100 is provided with a manual sheet supply path, as well as a sheet supply path from the sheet supply cassette unit 131. In FIGS. 6 and 7, a sheet supply inlet 224 for the manual sheet supply is disposed below the sheet supply cassette unit 131. Since the sheet supply path from the manual sheet supply inlet 224 is not curved but substantially straight as shown in FIG. 7, even a thicker recording sheet such as a post card and an envelope or a special recording sheet such as a plastic sheet having a stronger resiliency can easily be supplied.

Next, the mounting condition of the sheet supply cassette unit 131 and the sheet supply drive unit 132 will be explained with reference to FIGS. 7 to 9. In FIGS. 7 to 9, the sheet supply cassette unit 131 is mounted with a predetermined angle with respect to the frame 133 secured to the support 109. On the other hand, below the sheet supply cassette unit 131, there is disposed a substantially straight sheet path surface 225 (FIGS. 7 and 11) as a sheet supply path leading to the recording system 1. The sheet path surface 225 acts as both the sheet path from the sheet supply cassette unit 131 and the sheet supply path from the manual sheet supply inlet 224. Now, the inclination angle of the mounting of the sheet supply cassette unit 131 with respect to the frame 133 regulates an incident angle from the sheet supply cassette unit to the sheet path surface 225 to a proper value for smooth sheet supply.

Abutment ribs 226, 227 (FIGS. 7 and 11) are formed on left and right sides of the chassis 157 of the sheet supply drive unit 132, and, on the other hand, abutment surfaces 228, 229 (FIGS. 7 and 10) are formed on both left and right side of a lower portion of the cassette case 138 of the sheet supply cassette unit 131. As shown in FIG. 7, when the abutment ribs 226, 227 and the abutment surfaces 228, 229 are abutted against each other, the positional relation between the sheet supply cassette unit 131 and the sheet supply drive unit 132 is correctly determined when they are mounted. That is to say, the semi-cylindrical sheet supply rollers 142 for supplying the recording sheet 116 are mounted on the sheet supply drive unit 132 at positions confronting to the sheet supply cassette unit 131, so that the positional relation between the sheet supply rollers 142 and the separating pawls 149, 151 and the like of the sheet supply cassette unit 131 can be correctly determined.

In the illustrated embodiment, the abutment ribs 226, 227 each has a round end, and the abutment surfaces 228, 229 each comprises a substantially V-shaped concave surface, so as to provide the angular versatility, as well as to correctly regulate the distance and parallelism between the sheet supply rollers 142 rotatably mounted on the chassis 157 and the separating pawls 149, 151 mounted on the cassette case 138.

Incidentally, the inclination angle of the mounting of the sheet supply cassette unit 131 with respect to the frame 133 is regulated by a cassette case receiving portion 180 (FIG. 9) formed on the frame 133. With the positioning means for the sheet supply cassette unit 131 and the sheet supply drive unit 132 as mentioned above, the positional relation between the sheet supply rollers 142 and the sheet supply cassette unit constituting elements such as the separating pawls 149, 151 can be easily and correctly determined, thus improving the stability of the sheet supply.

In FIGS. 7 to 10, the pressure plate 140 is mounted on the sheet supply cassette unit 131. The pressure plate is spring biased toward the sheet supply rollers 142 by means of the pressure plate spring 141. When the recording sheets 116 are set, the recording sheets (sheet stack) 116 can be inserted while maintaining a condition that the pressure plate 140 is pressed down in opposition to the pressure plate spring 141 to separate the plate from the sheet supply rollers 142 and the separating pawls 149, 151. Laid U-shaped sheet guides 231, 232 for regulating the number of the recording sheets 116 to be stacked (height of the sheet stack) are formed on both sides of the pressure plate 140 in the sheet width direction.

The heights of guide surfaces of the sheet guides 231, 232 are so selected that they become lower than the separating pawls 149, 151 when the pressure plate 140 is pressed down (recording sheet insertion), and they become higher than the separating pawls 149, 151 when the pressure plate 140 is pressed up (releasing). With the arrangement of the sheet guides 231, 232 as mentioned above, when the recording sheets 116 are inserted or filled, since these guides become lower than the separating pawls 149, 151, it is possible to surely guide the recording sheets inside of the separating pawls 149, 151, thus inserting the recording sheets surely and easily.

On the other hand, when the recording sheet 116 is supplied by the sheet supply rollers 142 by biasing the pressure plate 140 toward the separating pawls 149, 151 (toward the sheet supply rollers 142), since the guide surfaces of the sheet guides 231, 232 become higher than the separating pawls 149, 151, the sheet stack (recording sheets) 116 is regulated at its height by the separating pawls 149, 151, and is not urged by the sheet guides 231, 232. Thus, it is possible to reduce the load acting on the recording sheet 116 during the sheet supply. Accordingly, with the height relation between the sheet guides 231, 232 of the pressure plate 140 and the separating pawls 149, 151 of the cassette case 138 as mentioned above, the separating ability and sheet supplying ability regarding the recording sheets 116 can be improved and stabilized.

Figure 16A:
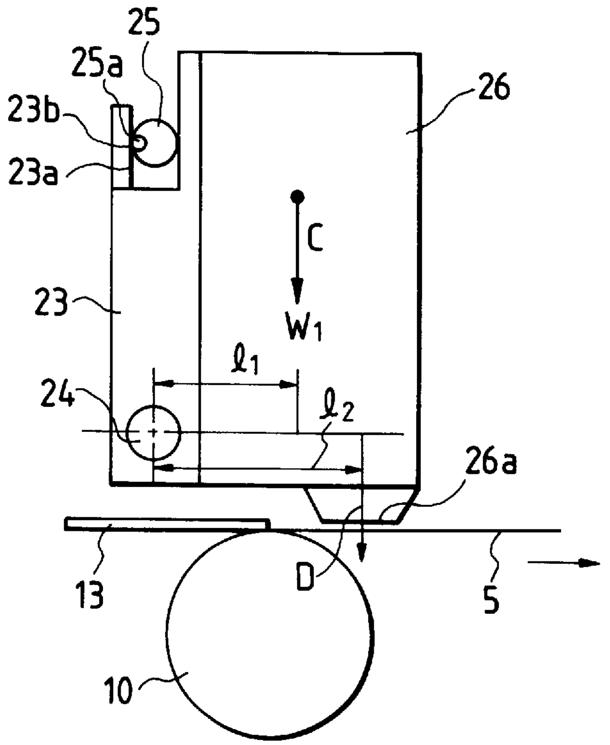
FIGS. 16A and 16B are schematic side views of a recording portion.

FIG. 16A shows a positional relation between the ink jet recording head 26 and the recording sheet 5 when the thin recording sheet 5 is used.

Incidentally, in this embodiment, the ink jet recording head 26 is of the type wherein the ink is discharged by utilizing thermal energy, and, thus, is provided with electrical/thermal converters for generating the thermal energy.

Figure 16B:
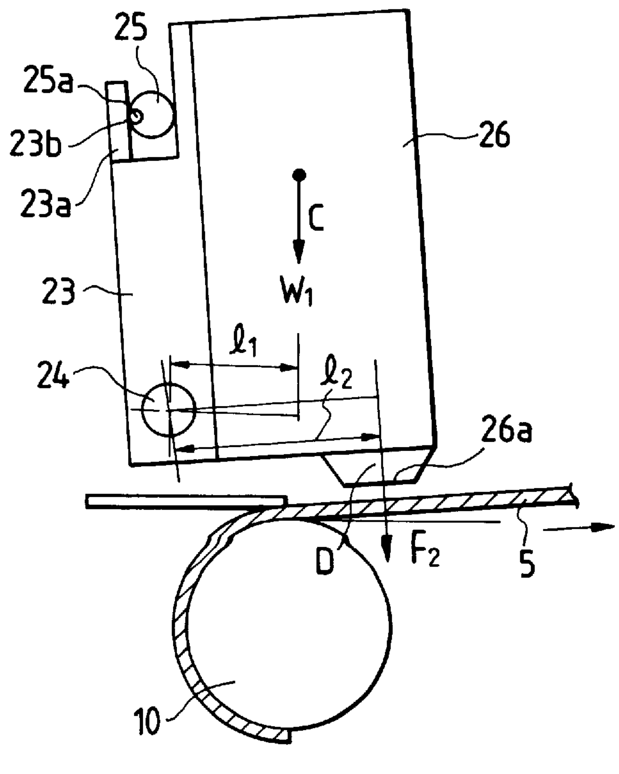

As shown in FIG. 16A, the engagement relation between the carrier guide shaft 25 and the upper end portion 23*a* of the carrier 23 is so set that the center of the carrier guide shaft 25 is in the left of the center of an end 25*a*. Whereas, when the thicker recording sheet 5 is used, as shown in FIG. 16B, the center of the carrier guide shaft 25 is in the right of the center of the end 25*a*. Incidentally, FIG. 16B shows a condition that the recording sheet 5 is fed around the sheet feed roller 10.

Incidentally, the arrow C shown in FIGS. 16A and 16B indicates a gravitational force acting on the center of gravity of the whole carrier system mounting the ink jet recording head 26 thereon. As apparent from these Figures, in the illustrated embodiment, the head is inclined by about 5 degrees toward a downstream side of the recording sheet feeding direction, and the center of gravity of the head acts on an upstream side of the ink discharge openings (nozzle) 26*a* in the recording sheet feeding direction. The arrow D indicates an ink discharging direction from the nozzle 26*a* of the ink jet recording head 26. In both conditions shown in FIGS. 16A and 16B, the carrier system mounting the ink jet recording head 26 thereon is subjected to the moment around the carrier shaft 24 due to the force acting on the center of gravity so that the moment acts to reduce the distance between the ink jet recording head 26 and the recording sheet 5 in both conditions. Further, actually, a clearance cannot help but generate between the upper end 23*a* of the carrier 23 and the carrier guide shaft 25.

However, the upper end 23*a* of the carrier 23 is always contacted with a left contacting point 23*b* of the carrier guide shaft 25 by the above-mentioned moment. Thus, the position of the contacting point 23*b* is always maintained, thereby permitting stable recording. In this case, when the distance between the direction C of the force acting on the center of gravity and the center of the carrier shaft 24 is $l_1$ and the distance between the direction D of the force acting on the discharging position of the nozzle 26*a* and the center of the carrier shaft 24 is $l_2$ and the force acting on the center of gravity is $W_1$, the following moment $M_1$ acts on the carrier system:

$$M_1 = l_1 \times W_1 \tag{1}$$

In this case, if the recording sheet 5 is abutted against the nozzle 26*a* for some reason, when the force by which the ink jet recording head 26 is pressed up is $F_2$, the following relation is obtained:

$$l_1 \times W_1 \leqq W_1 l_2 \times F_2 \tag{2}$$

That is, $$F_2 \geqq l_1 W_1 / l_2 \tag{3}$$

Now, in the illustrated embodiment, since $l_1 \leqq l_2$, the relation $l_1/l_2 \leqq 1$ is obtained. If a relation $l_1 \geqq l_2 (l_1/l_2 \geqq 1)$ is established, the force $F_2$ becomes larger than the case of $l_1/l_2 \leqq 1$, with the result that when the recording sheet is abutted against the head the impact force cannot be relieved, thus enhacing chance of the sheet jam.

However, in the illustrated embodiment, since $l_1/l_2 \leqq 1$, even if the recording sheet is abutted against the head, because the head can be rotated in an anti-clockwise direction by an amount corresponding to the play in the assembling of the head, the impact force can be relieved, thus reducing chance of the sheet jam. Further, in the illustrated embodiment, as mentioned above, since the recording head is inclined by about 5 degrees, the distance between the discharge opening surface and the recording sheet 5 is gradually increased in the sheet advancing direction, with the result that, even if the sheet is jammed, it can easily be removed.

Figure 17A:
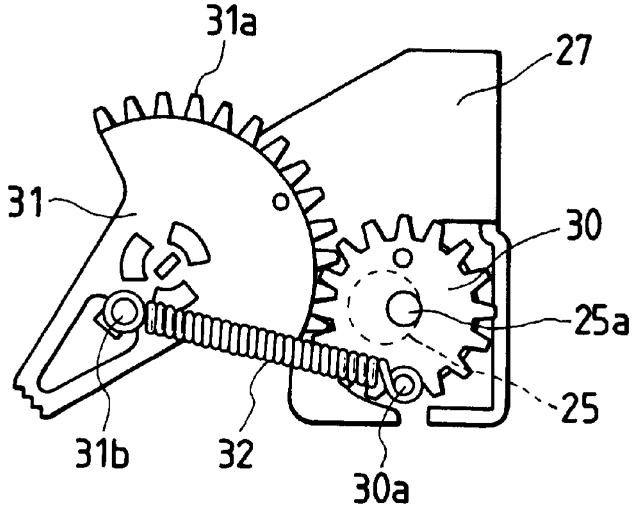
FIGS. 17A and 17B are side views of a releasing mechanism.

FIG. 17A shows a gap adjusting mechanism corresponding to FIG. 16A. In FIG. 17A, a changing gear 30 is secured to, the end 25*a* of the carrier guide shaft 25, which gear is meshed with a gear portion 31*a* of a gap adjusting lever 31. The gear and the lever are both rotatably mounted on a chassis 27. In order to remove the backlash between the gap adjusting lever 31 and the changing gear 30 and to provide a "click" feeling, a gap adjusting lever spring 32 is arranged between a dowel 30*a* of the changing gear 30 and a dowel 31*b* of the gap adjusting lever 31.

Figure 17B:
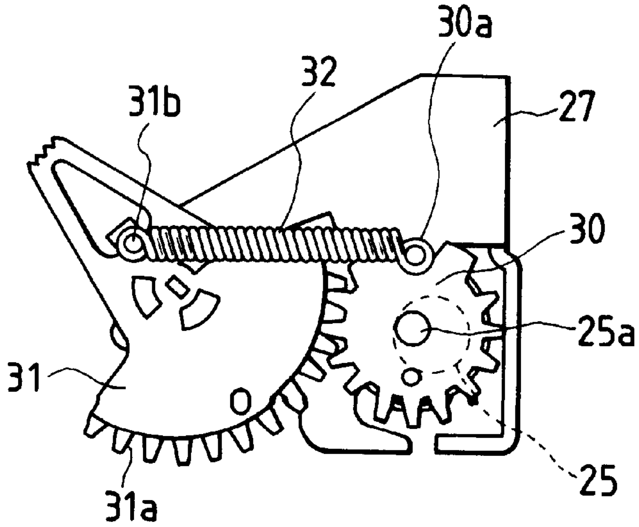

FIG. 17B shows the gap adjusting lever corresponding to FIG. 16B. With the arrangement as mentioned and illustrated above, since the carrier guide shaft 25 is not rotated during the recording operation, i.e., since the gap between the recording sheet 5 and the nozzle 26*a* of the ink jet recording head 26 is not changed, the discharged ink stably reaches the recording sheet 5, thus improving the recording quality.

Figure 18:
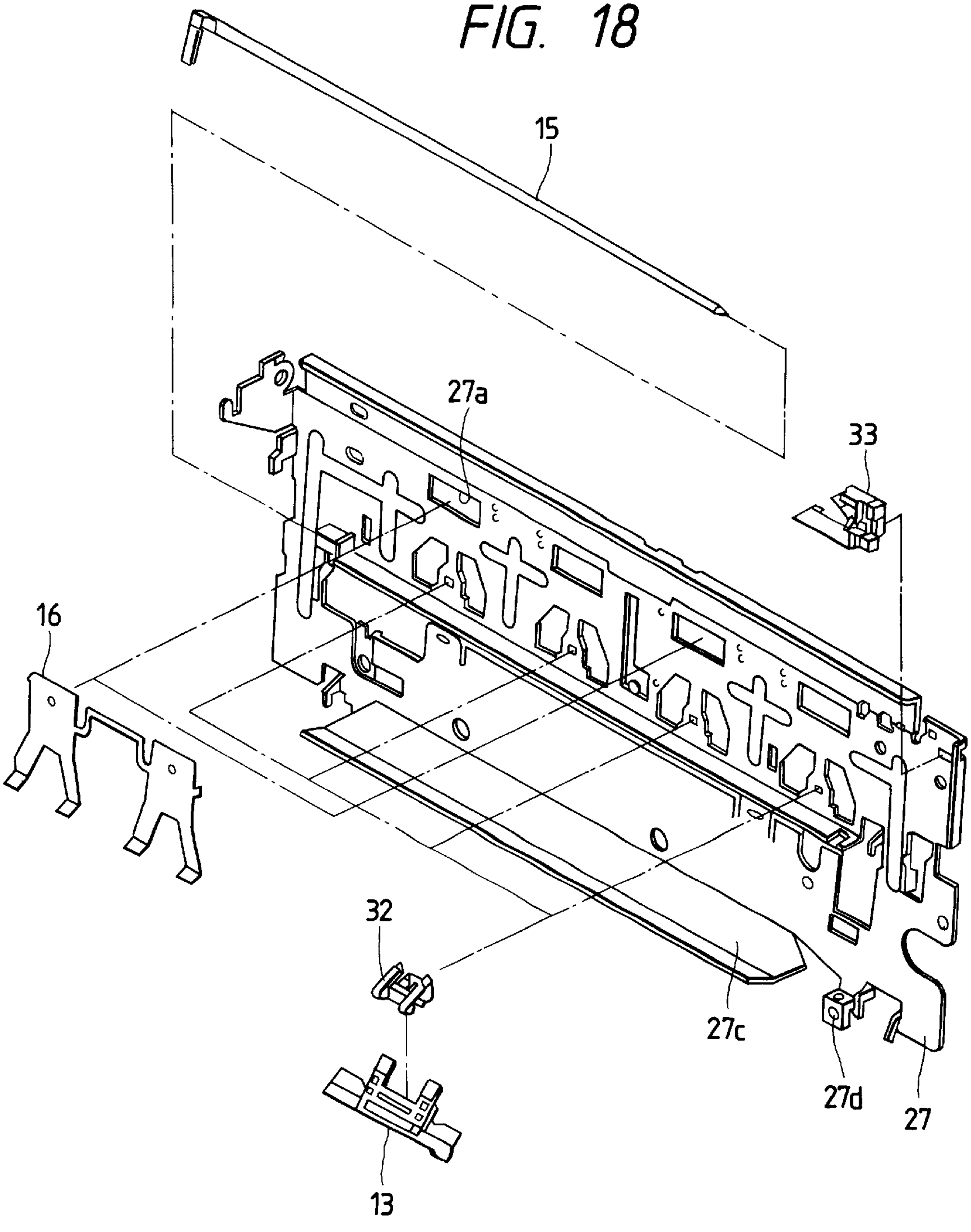
FIG. 18 is an exploded perspective view of a chassis.

In FIG. 18 showing constructural elements accompanying the chassis 27, the holder 13 is snappingly attached to a sub-holder 32 which is in turn snappingly attached to the chassis 27. The pressure spring 16 is housed in the rectangular hole 27*a* of the chassis 27 and provides the urging force to the holder 13. The reference numeral 33 denotes a shield plate detected by a home position sensor provided on the carrier 23. A tap portion 27*d* is provided for securing the shield plate 28 to the chassis 27 via a screw.

Figure 19:
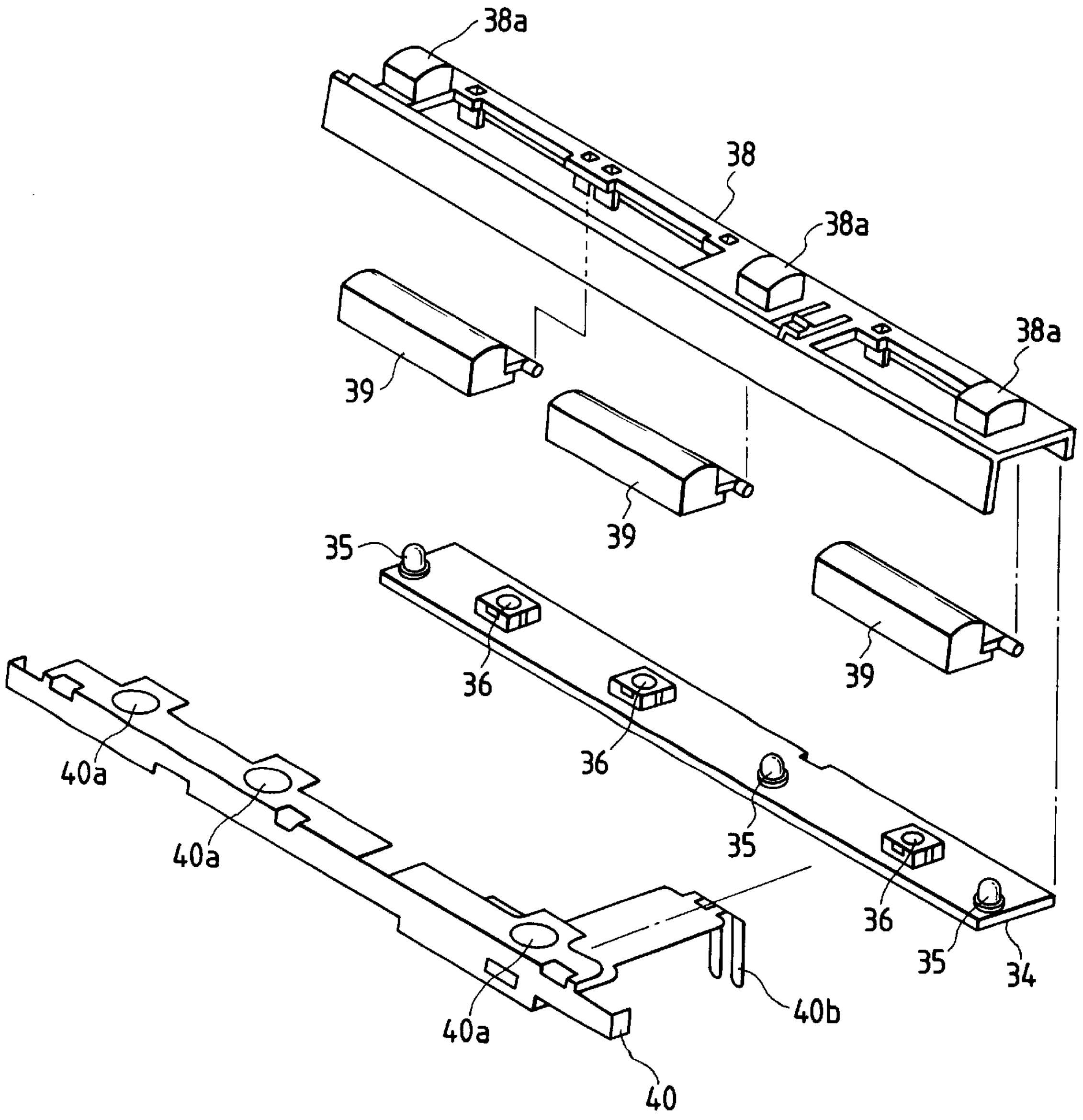
FIG. 19 is an exploded perspective view of a panel switch unit.

FIG. 19 is a view for explaining a panel switch unit. In FIG. 19, LEDs 35 and switches 36 are soldered to a substrate plate 34 which is mounted on an LED guide 38 by means of snaps (not shown). The LED guide 38 also serves as a housing for the panel switch unit, and members 38*a* actually serve as light guides for the LEDs. Three key tops 39 are snappingly attached to the LED guides for rotation, so that the substrate plate 34 is covered by a panel shield plate 40 as wide as possible to cope with the electrostatic effect. The panel shield plate includes holes 40*a* for receiving the switches 36, and tongues 40*b* urged against the chassis to be electrically connected thereto, as will be described later. The panel shield plate 40 is also snappingly attached to the LED guide 38. Thus, all of the members are mounted to the LED guide 38, providing a single unit.

Figure 20:
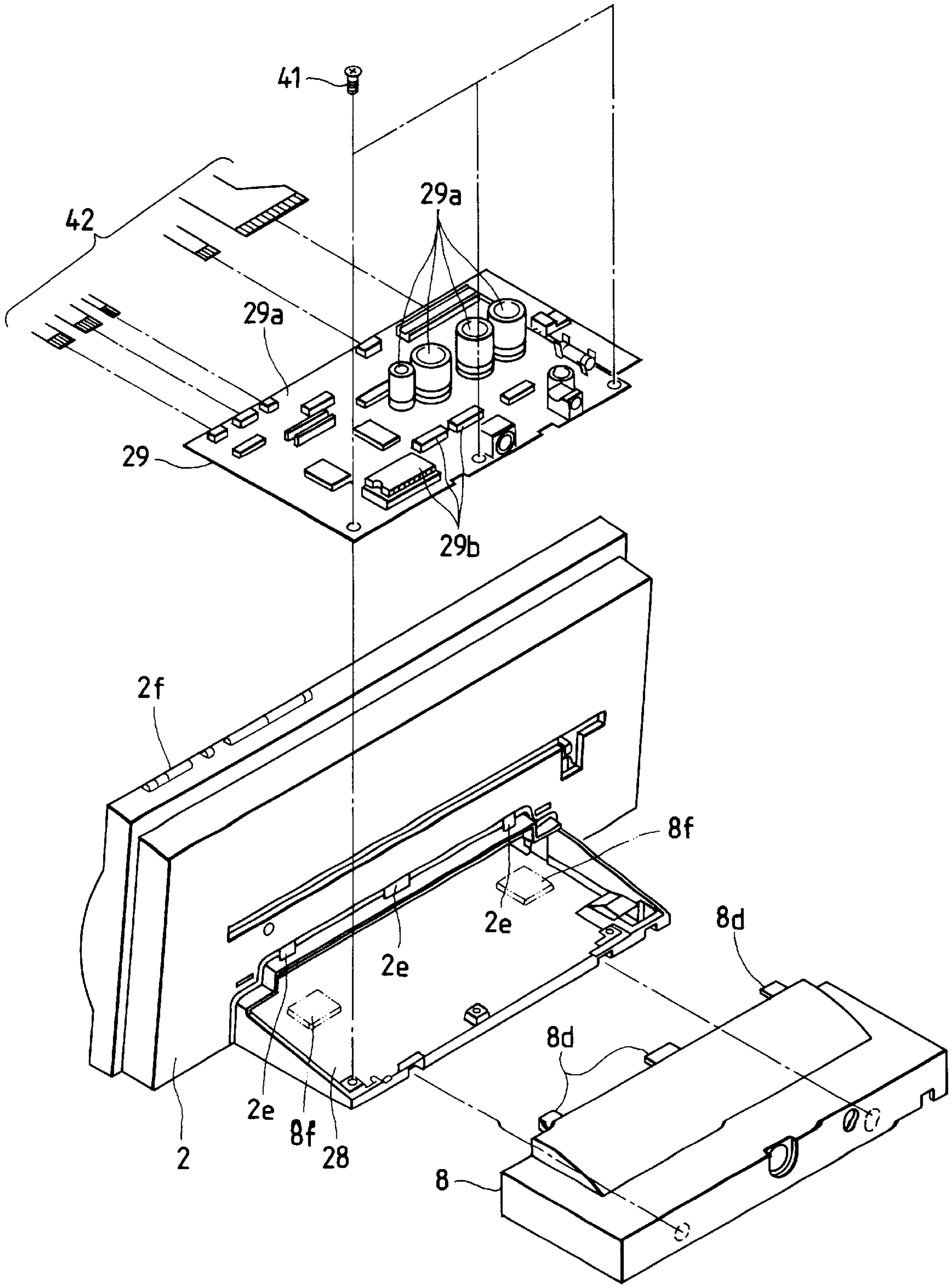

FIG. 20 is a view for explaining an operation that the shield plate 28, circuit board 29, circuit board cover 8 and the like are attached after the sheet feeding mechanism is attached to the lower case 2. As mentioned above, after the shield plate 28 is secured to the chassis 27 via the tap portion 27*d* and screw, the circuit board 29 on the shield plate 28 is attached to the lower case 2 by means of screws 41. Then, the circuit board cover 8 is snappingly attached to the lower case 2 by inserting a pawl 8*d* of the cover 8 into the rectangular hole 2*e* of the lower case. Incidentally, before the sheet feeding mechanism is attached to the lower case 2, the panel switch unit is received into a panel switch unit receiving portion 2*f* and is snappingly attached thereto. Connectors are gathered at an end of the circuit board 29, thus improving the maintenance and serviceability. Flexible cables 42 are connected to motors, sheet detection sensor, head and panel. Incidentally, the reference numeral 29*a* denotes capacitors; and 29*b* denotes transistors.

Figure 21:
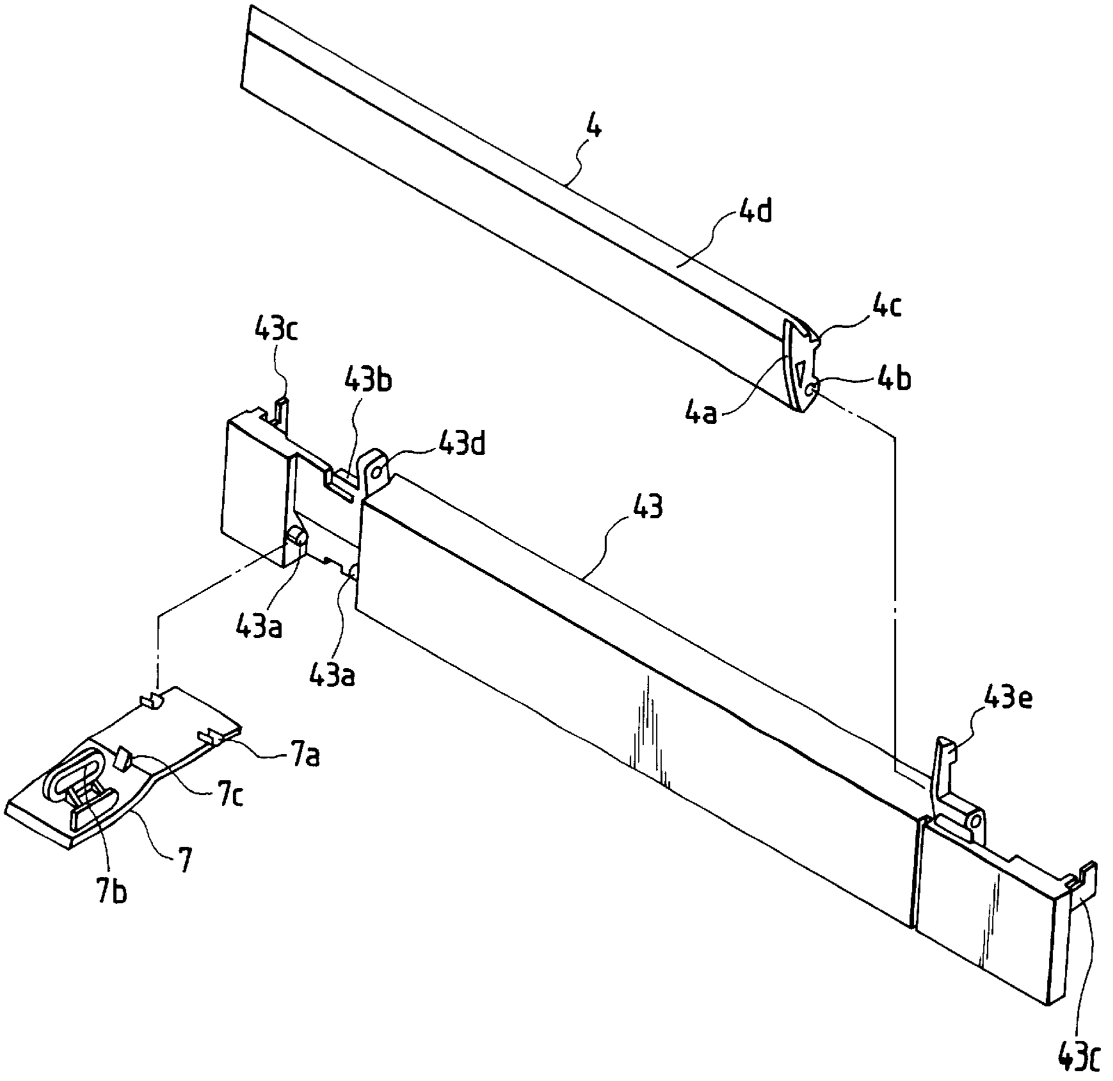
FIG. 21 is an exploded perspective view of a sub-cover unit.

In FIG. 21 showing a sub-cover unit, a sub-cover 43 has a recess in which dowels 43*a* are formed, and pawls 7*a* of the release lever 7 can be snappingly attached to these dowels. Further, a dowel of a member for rotating the D-shaped shaft 15 is inserted into a slot 7*b* formed in the release lever 7. When the release lever 7 is rotated around the dowels 43*a* of the sub-cover 43, the dowel of the member for rotating the D-shaped shaft 15 slides along the slot 7*b* of the release lever 7. Consequently, the urging force of the pinch roller 11 and the needle rollers 14 against the feed roller 10 can be released. A locking pawl 7*c* of the release lever 7 is engaged by a lever portion 43*b* of the sub-cover 43, thus providing the click feeling. A snap pawls 43*c* are used to attach the sub-cover unit to the lower case 2. That is to say, when the locking pawl 7*c* is abutted against the lever portion 43*b*, the click feeling is firstly obtained, and, thereafter, when the release lever 7 is further rotated, the pawl 7*c* is entered below the lever portion 43*b*.

The input door 4 is rotatably mounted on the sub-cover 43 by inserting dowels 4*b* of the door into holes 43*d* of the sub-cover. When the door is closed, it is locked by fitting a pawl 43*e* of the sub-cover 43 into a recess 4*c* of the door. Incidentally, an inclined surface 4*d* of the door 4 is provided for improving the sheet ejecting ability. Further, when the input door 4 is opened, it also acts as a guide for the insertion of the recording sheet 5, and, as mentioned above, a right side of the recording sheet 5 is positioned by the end surface 4*a* as the reference.

Figure 22:
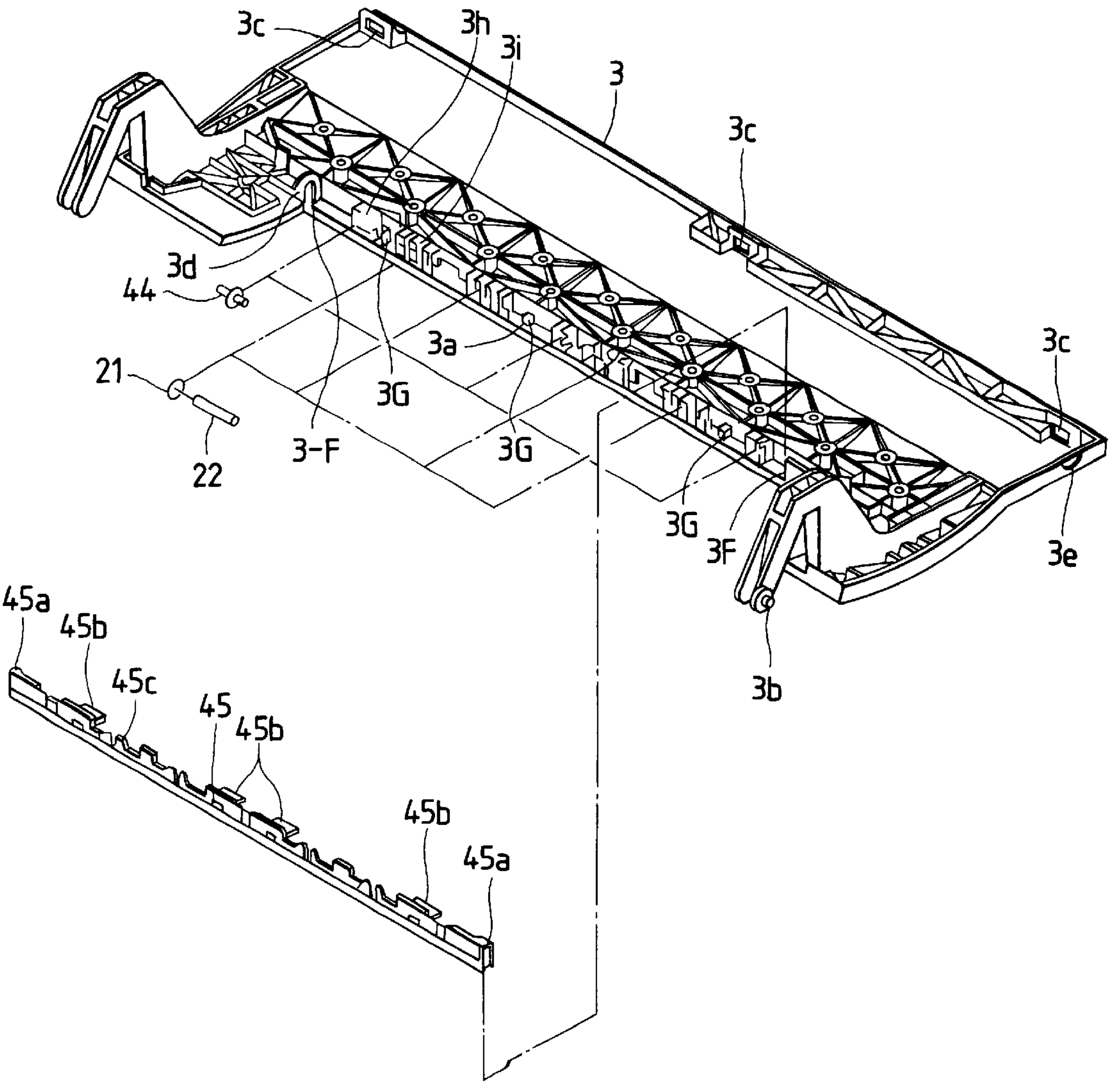
FIG. 22 is an exploded perspective view of an upper cover unit.

FIG. 22 is a view for explaining an upper cover unit. In FIG. 22 movable spurs 21 and fixed spurs 44 are arranged on an end 3*a* of the upper cover 3 to avoid the contact between the recorded sheet and the end 3*a* for preventing the sheet from being smeared with ink, and to hold down the recording sheet. Each movable spur 21 has a central opening into which a spur spring 22 is inserted. The spur springs 22 serve as elastic support shafts so that the spurs 21 can be elastically shifted in accordance with the resiliency of the recording sheet 5. On the other hand, each fixed spur 44 has a shaft formed integrally therewith. The fixed spurs 44 are provided for preventing the recorded surface of the recording sheet 5 from contacting the upper cover 3 when the movable spurs 21 are pressed up for some reason, thus protecting the recorded surface of the recording sheet from smearing with ink. In FIG. 22, the movable and fixed spurs 21, 44 is held by a spur holder 45. The spur holder 45 is molded from elastic material. By using the elasticity of the holder, the latter is secured to the upper case 3 by ends 45*a* of the holder and is hooked by tongues 3F of the upper case 3. The holder is positioned with respect to the upper case by engaging hooks 45*b* of the holder by recesses 3G of the upper case. The reference numeral 3*b* denotes a dowel for rotatably attaching the upper case to the lower case 2, and a plurality of ribs are formed on the upper case 3 to strengthed the latter. Three pawl receivers 3C are formed on the upper case to receive locking pawls 2*g* of the lower case 2. More particularly, the fixed spurs 44 are engaged by three projections 3*h* formed on the upper case 3 and the movable spurs 21 are attached to four projections 3i formed on the upper case via the respective spur springs 22, and then the spur holder 45 is attached to he upper case as mentioned above. Incidentally, the spur springs for the movable spurs 21 are mounted between the projections 3i of the upper case by thinner portion 45*c* of the holder 45.

Figure 23:
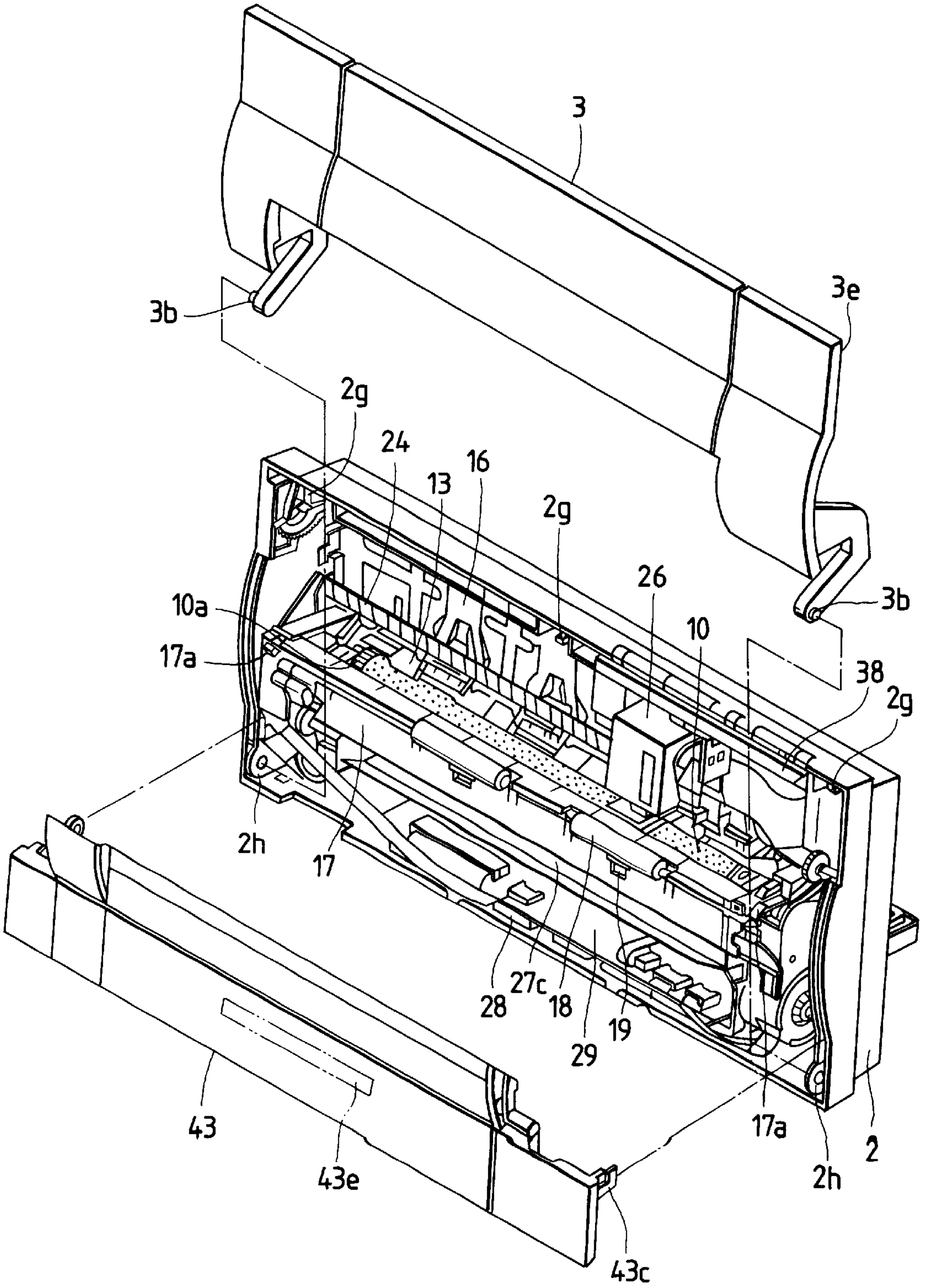
FIG. 23 is an exploded perspective view for the explaining of the attachement of the sub-cover unit and the upper cover unit to a lower case.
Figure 24:
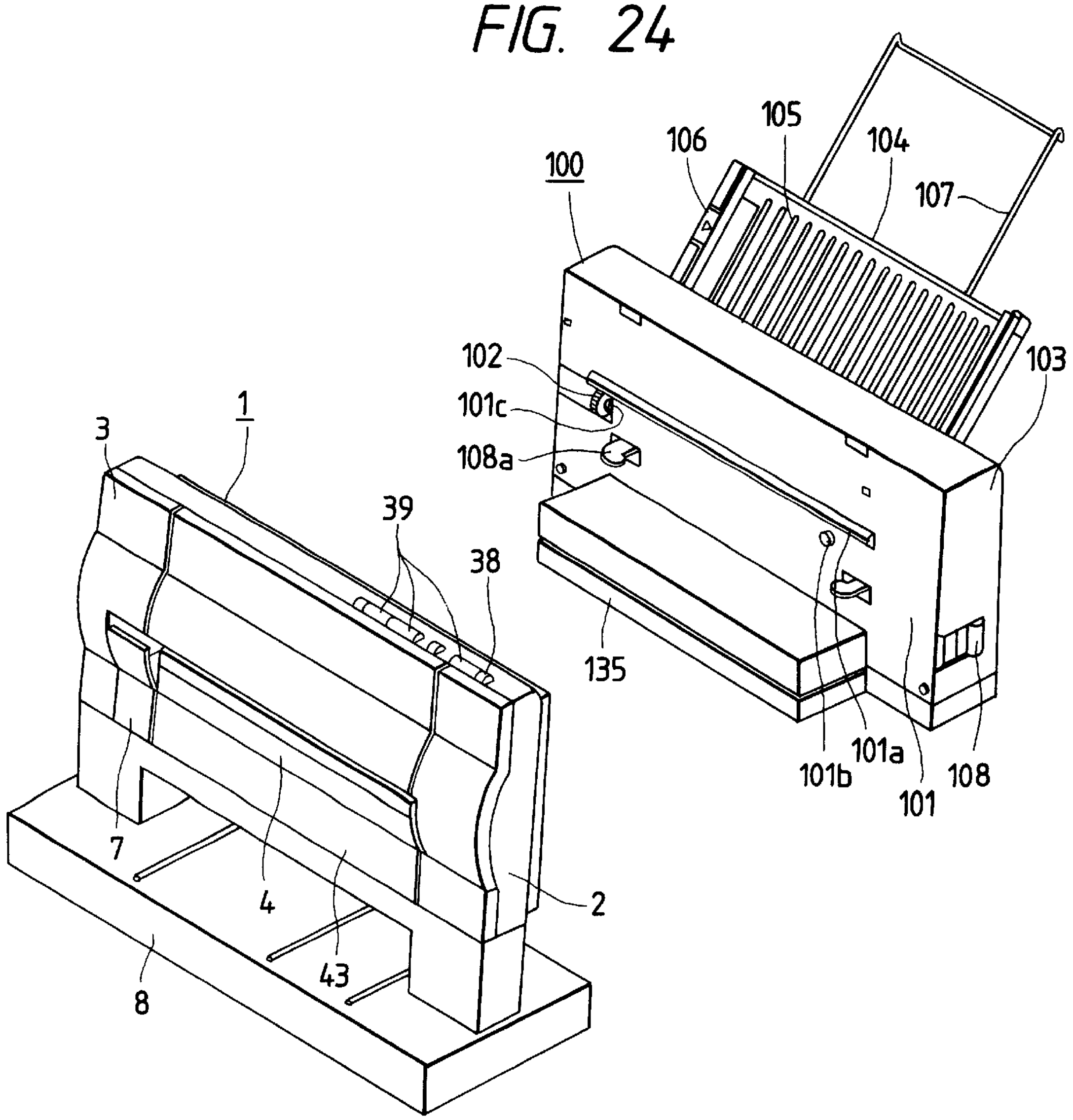
FIG. 24 is a perspective view of a recording system and an automatic sheet supplying apparatus, according to the other embodiment of the present invention.
Figure 25:
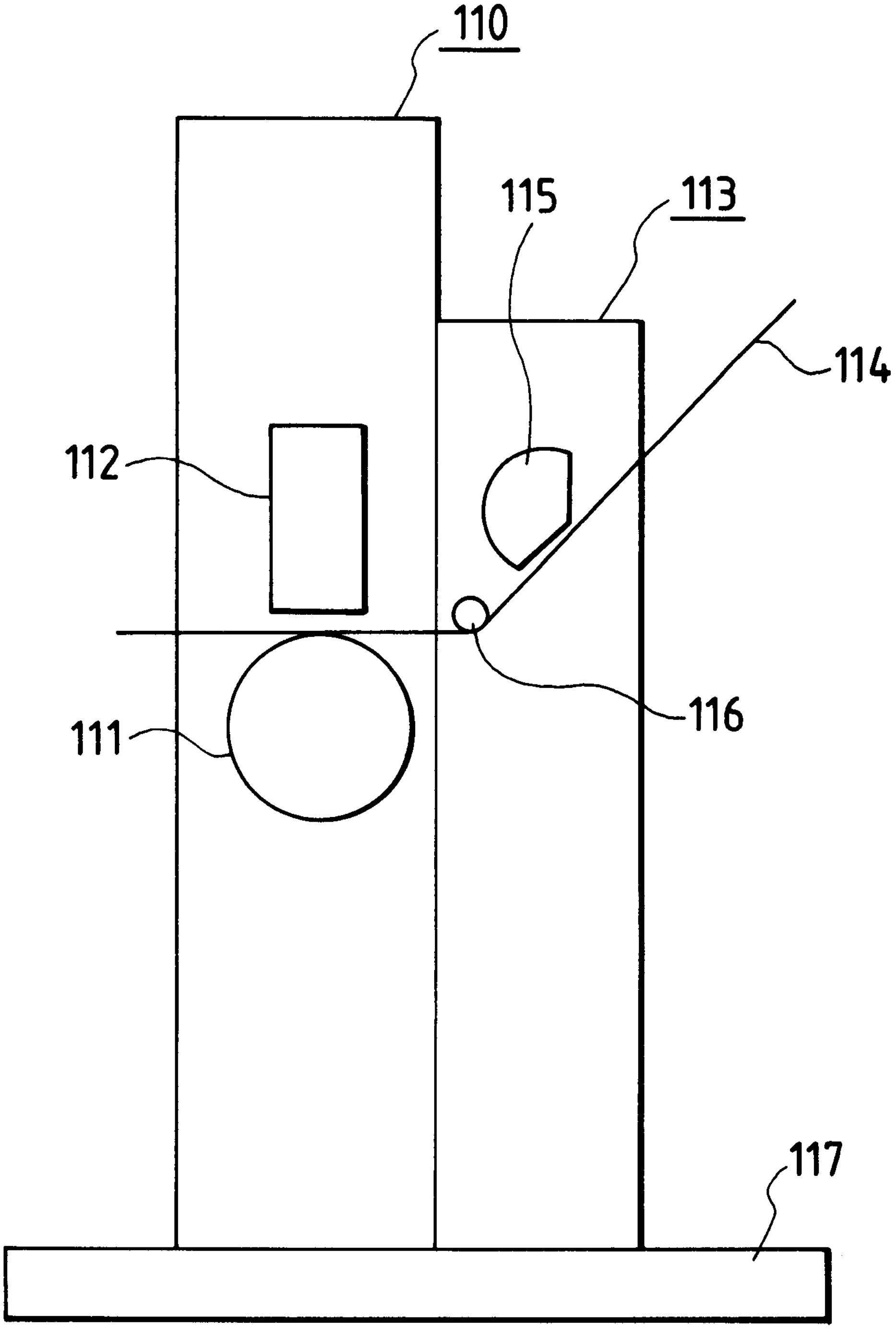
FIG. 25 PRIOR ART
FIG. 25 is a schematic side view of a conventional system.

In FIG. 23 for explaining the attachment of the sub-cover unit to the lower case 2, the dowels 3*b* of the upper cover 3 are inserted into slots 2*h* of the lower case 2. When the upper cover 3 is rotated around the dowels 3*b*, the upper cover 3 is locked to the lower case 2 by the pawl receivers 3*c* of the upper cover 3 and the pawls 2*g* of the lower case 2. In this case, a platen lock pawl 3*d* of the upper cover 3 is locked against a platen lock pawl 17*a* of the platen 17. Further, the platen lock pawl 3*d* is always urged against the platen lock pawl 17*a* of the platen 17 by engaging the locking pawls 2*g* of the lower case 2 by the pawl receivers 3*c* of the upper cover 3 via inclined surfaces, thus maintaining the positional relation between the ejector roller 18 and the movable and fixed spurs 21, 44 properly. Incidentally, the reference numeral 3*e* denotes a grip used to open the upper cover 3.

Further, by snappingly inserting the locking pawls 43*c* of the sub-cover 43 into rectangular openings (not shown) formed in the lower case 2, the sub-cover is integrally secured to the lower case 2. Further, the sub-cover 43 is provided at its ends with recessed portions 43*e* for pinching both ends of the circuit board 29 therebetween so that the end of the circuit board on which the connectors are gathered is received between the recessed portions. In this way, although the circuit board 29 is fixed at its one end, since the board is received between the recessed portions 43*e* at its one side with play, the board is not secured completely; thus, since the flatness of the circuit board is not corrected, the substrate plate is not subjected to the stress. Further, since the connectors on the circuit board are positioned in the sub-cover 43, when the sub-cover 43 is opened, all of flexible cables can be disconnected, thus improving the serviceability.

Incidentally, when the present invention is particularly applied to the ink jet recording system wherein the ink is discharged by utilizing thermal energy, the present invention gives excellent advantages. According to such a recording system, the recording can be attained with high density and with high resolving power.

Preferably, the typical construction and principle thereof can be realized by using the fundamental principles, for example, disclosed in U.S. Pat. Nos. 4,723,129 and 4,740,706. Although this system can be applied to both a so-called "on-demand type" and "continuous type", it is more effective when the present invention is particularly applied to the on-demand type, because, by applying at least one drive signal corresponding to the record information and capable of providing the abrupt temperature increase exceeding the nucleate boiling to the electrical/thermal converting elements arranged in correspondence to the paper or liquid passages including the liquid (ink) therein, it is possible to form a bubble in the liquid (ink) corresponding to the drive signal by generating the film boiling on the heat acting surface of the recording head due to the generation of the thermal energy the electrical/ thermal converting elements. Due to the growth and contraction of the bubble, the liquid (ink) is discharged from the discharge opening to form at least one ink droplet. When the drive signal has a pulse shape, since the growth and contraction of the bubble can be quickly effected, an excellent ink discharge is achieved. Such pulse-shaped drive signal may be ones disclosed in U.S. Pat. Nos. 4,463,359 and 4,345,262. Incidentally, by adopting the condition disclosed in U.S. Pat. No. 4,313,124, providing the invention regarding the temperature increasing rate on the heat acting surface, a further excellent recording can be performed.

As the construction of the recording head, the present invention includes the construction wherein the heat acting portion is disposed in an arcuate area as disclosed in U.S. Pat. Nos. 4,558,333 and 4,459,600, as well as the constructions wherein the discharge openings, liquid paths and electrical/thermal converting elements are combined (straight liquid paths or orthogonal liquid paths). In addition, the present invention can be applicable to the construction wherein each discharge opening is constituted by a slit with which a plurality of electrical/thermal converting elements associated in common as disclosed in the Japanese Patent Laid-Open No. 59-123670 and the construction wherein openings for absorbing the pressure wave of the thermal energy are arranged in correspondence to the discharge openings as disclosed in the Japanese Patent Laid-Open No. 59-138461, because the recording can be correctly and effectively performed regardless of the configuration of the recording head.

Further, the present invention can be applied to a recording head of the full-line type having a length corresponding to a maximum width of a recording medium to be recorded, as such recording head, the construction wherein such length is attained by combining a plurality of recording heads or a single recording head integrally formed may be adopted.

In addition, among the above-mentioned serial types, the present invention is effectively applicable to a removable recording head of a chip type wherein, when mounted on the recording system, an electrical connnection between it and the recording system and the supply of ink from the recording system can be permitted, or to a recording head of cartridge type wherein a cartridge is integrally formed with the head.

Preferably, the present invention provides further excellent advantages by additionally providing a recovery means for the recording head and auxiliary means as accessories. For example, these means include a capping means for the recording head, cleaning means, pressurizing or sucking means, and a preliminary heating means comprising electrical/thermal converters or other heating elements or the combination thereof. Further, a preliminary ink discharge mode effected regardless of the recording is effective to the stable recording.

Further, as to the kind and number of the recording head to be mounted, each recording head may correspond to each different color ink, or a plurality of recording heads can be used for a plurality of ink having different colors and/or different density. Further, as the recording mode of the recording system, the present invention can effectively be applied not only to a recording mode with a single main color such as black, but also to a system providing a plurality of different colors and/or a full-color by mixing colors by using an integrated recording head or the combination of plural recording heads.

Further, in the illustrated embodiments, while the ink was liquid, the ink may be solid at temperature or less, or may be softened at room temperature. In the above-mentioned ink jet recording system, since the temperature control is generally effected in a temperature range from 30° C. to 70° C. so that the viscosity of the ink is maintained within a stable discharging range, the ink may be liquidized when the record signal is emitted. In addition, ink having a feature that is firstly liquidized by thermal energy, such as solid ink which serves to prevent the increase in temperature by absorbing energy in changing the ink from the solid state to the liquid state or which is in the solid state in the preserved condition to prevent the vaporization of ink and which is liquidized into ink liquid to be discharged in response to the record signal comprising the thermal energy, or ink which has already been solidified upon reaching the recording medium, can also be applied to the present invention. In such a case, the ink can be held in the liquid state or solid state in recesses or hollows in a porous sheet as disclosed in the Japanese Patent Laid-Open Nos. 54-56847 and 60-71260, in confronting relation to the electrical/thermal converters. Incidentally, in the present invention the above-mentioned film boiling principle is most effective for each ink.

Furthermore, the recording system according to the present invention may be in the form of an image output terminal device for an information processing apparatus such as a computer, or a copying machine combined with a reader, or a facsimile having the sending and receiving functions.

What is claimed is:

1. A recording apparatus having both a recording unit and a sheet supplying unit detachably mounted to said recording unit, said recording unit having an inlet on a surface thereof and said sheet supplying unit having an outlet on a surface thereof, said recording apparatus comprising:

a projection projecting from a lower and a side surface of a body of the recording unit, said projection having an extension in a width-wise direction and extending horizontally to form a substantially L-shape together with the body thereof, so that the recording unit can stand by itself with a bottom surface of the body and a bottom surface of the projection;

a recess formed in a bottom portion of the sheet supplying unit and extending in accordance with the projection laterally; and a support formed extending laterally and protruding horizontally on the sheet supplying unit, said support having an upper surface and a bottom surface and an area broader than the bottom surface of the sheet supplying unit, enabling the sheet supplying unit to stand by itself, wherein the recording unit is connected to the sheet supplying unit by inserting said projection into said recess with the surface of the recording unit on which the sheet inlet is formed, and the surface of said sheet supplying unit on which the sheet outlet is formed are opposed, upon being fitted to each other, and such that the recording unit rides on the supplying unit.

2. A recording apparatus according to claim 1, wherein the sheet supplying unit has said support for supporting a body of the recording unit, and wherein said projection of the recording unit is guided into said recess by sliding said projection on said support.

3. A recording apparatus according to claim 2, wherein said projection has a bottom surface and the support has an upper surface, further comprising positioning means for positioning the recording unit and the sheet supplying unit upon connection therebetween, and for separating the bottom surface of said projection from the upper surface of said support, after mutual positioning between the recording unit and the sheet supplying unit is effected by said positioning means.

4. A recording apparatus according to claim 3, wherein said positioning means comprises dowels and holes which are chamfered.

5. A recording apparatus. according to claim 3, wherein the sheet supplying unit can stand by itself by said support.

6. A recording apparatus according to claim 5, wherein an ejection tray unit is extractably housed within said support.

7. A recording apparatus according to claim 6, wherein said ejection tray unit has a plate-shaped ejection tray, an ejection sheet support mounted on a shaft for rocking movement between a folded position with regard to said ejection tray and an extended position where said ejection sheet support extends in a sheet ejecting direction, and a pair of left and right sub-plates mounted on shafts for rocking movement between a folded position relative to said ejection tray and an upright position where said sub-plates support an ejected recording sheet, and wherein said sub-plates are rotated about the shafts that the sub-plates are mounted in synchronous with rotation of said ejection sheet support about the shaft said ejection sheet support is mounted.

8. A recording apparatus according to claim 7, wherein a sheet stopper for regulating positions of leading ends of recording sheets during stacking of the recording sheets is formed on said ejection sheet support, and said sheet stopper is mounted for slidable movement in a sheet ejecting direction.

9. A recording apparatus according to claim 8, further comprising a slide mechanism for extending and retracting said sheet stopper.

10. A recording apparatus according to claim 2, wherein a sheet supply cassette unit and a sheet supply drive unit of said sheet supplying unit are mounted on said support, and said support also acts as at least a part of an ejection tray.

11. A recording apparatus according to claim 10, wherein a frame is secured to said support, and said sheet supply cassette unit and said sheet supply drive unit are mounted on said frame.

12. A recording apparatus according to claim 11, wherein a manual sheet supply inlet is arranged below said sheet supply cassette unit.

13. A recording apparatus according to claim 12, wherein an ejection tray unit is extractably housed within said support.

14. A recording apparatus according to claim 10, wherein an ejection tray unit having at least first and second sides is extractably housed within said support, and rack gears are arranged on both sides of said support and gears meshed with said rack gears are mounted on both sides of said ejection tray unit, so that said gears are rolled along said rack gears when said ejection tray unit is extracted and retracted.

15. A recording apparatus according to claim 14, wherein a pushing projection protruding from a rear side opposite a front side wherein said ejection tray unit is extracted, of said support is formed on said ejection tray unit, whereby, after said ejection tray unit is pushed forwardly by pushing said pushing projection, said ejection tray unit can be extracted forwardly by hand.

16. A recording apparatus according to claim 1, wherein said sheet supplying unit comprises a sheet supply cassette unit and a sheet supply drive unit, and said sheet supply cassette unit comprises a cassette case, separating pawl members with inner and outer surfaces mounted on said cassette case, and a pressure plate, having a front side and back side, for urging stacked recording sheets against inner surfaces of said separating pawl members wherein inner surfaces of said separating pawl directly oppose said pressure plate; and wherein guides for regulating a height of the stacked recording sheets are arranged on both sides of said pressure plate, and a height of said guides is selected that said guides become lower than said separating pawl members when said pressure plate is pressed down and become higher than said separating pawl members when said pressure plate is pressed up.

17. A recording apparatus according to claim 1, wherein a sheet supply cassette unit and a sheet supply drive unit of said sheet supplying unit are mounted on a frame of said supplying unit, and wherein said sheet supply cassette unit and said sheet supply drive unit are mounted, by rotatably abutting convex and concave engagement portions formed on opposing sides of a chassis of said sheet supply drive unit and on a cassette case of said sheet supply cassette unit against each other, and wherein a distance between sheet supply rollers rotatably mounted on said chassis and separating pawls mounted on said cassette case is regulated.

18. A recording apparatus according to claim 17, wherein an inclination angle with respect to said frame of said sheet supply cassette unit is determined by a sheet supply cassette unit mounting surface formed on said frame.

19. A recording apparatus according to claim 1, wherein said recording unit comprises an ink jet recording head in which ink is discharged by utilizing thermal energy, and electrical/thermal converters are used for generating the thermal energy.

20. A recording apparatus according to claim 19, wherein said recording means discharges the ink by utilizing a change in condition caused by the growth of a bubble due to film boiling generated by the thermal energy supplied by said electrical/thermal converter.

21. A recording unit for use with a recording apparatus having a sheet supplying unit, the recording unit being connected to said sheet supplying unit, said recording unit comprising:

a projection projecting from a lower and side surface of a body of the recording unit and having an extension in a width-wise direction thereof projecting horizontally to form a substantially L-shape together with the body thereof, so that the recording unit can stand by itself with a bottom surface of the body and a bottom surface of the projection, wherein the recording unit is connectable to the sheet supplying unit by inserting the projection into a recess formed in the sheet supplying unit along a bottom portion thereof;

a sheet inlet provided on said recording unit to be opposed to a sheet outlet provided on the sheet supplying unit; and positioning means provided partially in said recording unit for positioning said recording unit with the sheet supplying unit at a position where said sheet inlet and the sheet outlet coincide with each other, said positioning means also for separating a lower surface of said projection from the bottom surface of the recess when positioning between said recording unit and the sheet supplying unit has been completed.

22. A recording unit according to claim 21, wherein said positioning means comprises a projection and a recess positionable with regard to each other by vertical movement of one, whereby the projection and the recess are aligned and engaged.

23. A recording unit for use with a recording apparatus having a sheet supplying unit, the sheet supplying unit being connected to said recording unit, said recording unit comprising:

a recess formed on a bottom portion of the recording unit extending laterally, the sheet supplying unit being connected to the recording unit by inserting a projection projecting from a lower and side surface of a body of the sheet supplying unit to the recess of the recording unit;

a support formed extending laterally and protruding horizontally and having an upper and a bottom surface and an area broader than the bottom surface of the recording unit enabling the recording unit to stand by itself;

a sheet inlet provided on said recording unit, to be opposed to a sheet outlet provided on the sheet supplying unit; and positioning means provided partially in said recording unit for positioning said recording unit and the sheet supplying unit into a position where said sheet inlet and the sheet outlet coincide with each other, wherein said positioning means is also for separating a lower surface of the projection from a lower surface of said recess when the positioning between said recording unit and the sheet supplying unit has been completed.

24. A recording unit according to claim 23, wherein said positioning means comprises a projection and a recess positionable with regard to each other by vertical movement of one, whereby the projection and the recess are aligned and engaged.

25. A sheet supplying unit for use in a recording apparatus having a recording unit with a sheet inlet provided on the recording unit, the sheet inlet being opposed to a sheet outlet provided on said sheet supplying unit, said sheet supply unit comprising:

a projection projecting from a lower and a side surface of a body of the sheet supplying unit and having an extension in a width-wise direction thereof and projecting horizontally to form a substantially L-shape together with the body thereof so that the sheet supplying unit can stand by itself with a bottom surface of the body and a bottom surface of the projection, wherein the sheet supplying unit is connectable to said recording unit by inserting said projection into a recess formed in the recording unit along a bottom portion thereof; and positioning means provided partially in said sheet supplying unit for positioning the recording unit and said sheet supplying unit into a position where the sheet inlet and the sheet outlet coincide with each other, wherein said positioning means is also for separating a lower surface of said projection from a lower surface of the recess when positioning between the recording unit and said sheet supplying unit has been completed.

26. A sheet supplying unit according to claim 25, wherein said positioning means comprises a projection and a recess positionable with regard to each other by vertical movement of one, whereby the projection and the recess are aligned and engaged.

27. A sheet supplying unit for use in a recording apparatus having a recording unit with a sheet inlet provided on the recording unit, the sheet inlet being opposed to a sheet outlet provided on said sheet supplying unit, said sheet supplying unit comprising:

a recess formed in a bottom portion and extending generally laterally, the recording unit being connectable to the sheet supplying unit by inserting a projection projecting from a lower and side surface of a body of the recording unit in the recess of the sheet supplying unit;

a support formed extending laterally and protruding horizontally, said support having an upper surface and a bottom surface and area broader than the bottom surface of the sheet supplying unit enabling the sheet supplying unit to stand by itself;

a sheet outlet provided on said sheet supplying unit, said sheet outlet being opposed to a sheet inlet, which is provided on the recording unit; and positioning means provided partially in said sheet supplying unit for positioning the recording unit and said sheet supplying unit into a position where said sheet inlet and said sheet outlet coincide with each other, wherein said positioning means is also for separating a lower surface of the projection formed on the recording unit from a lower surface of the recess when positioning between the recording unit and said sheet supplying unit has been completed.

28. A sheet supplying unit according to claim 27, wherein said positioning means comprises a projection and a recess positionable with regard to each other by vertical movement of one, whereby the projection and the recess are aligned and engaged.

29. A recording unit for use in a recording apparatus having both of said recording unit and a sheet supplying unit detachably mounted to said recording unit, said recording apparatus comprising:

a projection formed on a bottom portion of at least one of said recording unit and the sheet supplying unit to extend generally laterally thereof and to protrude generally horizontally to form a substantially L-shape together with a body thereof, so that at least one of said recording unit and the sheet supplying unit can stand by itself being supported by a bottom surface of said projection;

a recess formed in a bottom portion of at least one of the sheet supplying unit and said recording unit to extend generally laterally; and a support formed to extend laterally and protrude horizontally on at least one of the sheet supplying unit and said recording unit on which said recess is formed, said support having an area broader than the bottom surface of the sheet supplying unit or the recording unit on which said projection is formed, enabling at least one of the sheet supplying unit and said recording unit on which said recess is formed to stand by itself, wherein said recording unit is connected to the sheet supplying unit by inserting said projection into said recess with a surface of said recording unit on which a sheet inlet is formed and a surface of the sheet supplying unit on which a sheet outlet is formed are opposed upon being fitted to each other and such that the one of the recording unit and the supporting unit having said projection rides on the other of the recording unit and the supplying unit having said support.

30. A sheet supplying unit for use in a recording apparatus having both of a recording unit and said sheet supplying unit detachably mounted to the recording unit, said recording apparatus comprising:

a projection formed on a bottom portion of at least one of the recording unit and said sheet supplying unit to extend generally laterally thereof and to protrude generally horizontally to form a substantially L-shape together with a body thereof, so that at least one of the recording unit and said sheet supplying unit can stand by itself being supported by a bottom surface of said projection;

a recess formed in a bottom portion of at least one of sheet supplying unit and the recording unit to extend generally laterally; and a support formed to extend laterally and protrude horizontally on at least one of said sheet supplying unit and the recording unit on which said recess is formed, said support having an area broader than the bottom surface of the sheet supplying unit or the recording unit on which said projection is formed, enabling at least one of said sheet supplying unit and the recording unit on which said recess is formed to stand by itself, wherein the recording unit is connected to said sheet supplying unit by inserting said projection into said recess with a surface of the recording unit on which a sheet inlet is formed and a surface of said sheet supplying unit on which a sheet outlet is formed are opposed, upon being fitted to each other and such that the one of the recording unit and the supplying unit having said projection rides on the other of the recording unit and the supplying unit having said support.

31. A recording apparatus comprising:

a recording unit comprising a projection projecting from a lower and side surface of a body of the recording unit horizontally and forming a substantially L-shape together with the body thereof so that the recording unit can stand by itself with a bottom surface of the body and a bottom surface of the projection;

a sheet supplying unit connected to said recording unit by inserting the projection into a recess formed in said sheet supplying unit along a bottom portion thereof so that the sheet supplying unit can stand by itself;

a sheet inlet provided in said recording unit, said sheet inlet being opposed to a sheet outlet provided on said sheet supplying unit; and positioning means provided in said recording unit and said sheet supplying unit for positioning said recording unit and said sheet supplying unit into a position where said sheet inlet and the sheet outlet coincide with each other, said positioning means also for floating a lower surface of the projection of said recording unit from a lower surface of the recess of said sheet supplying unit after positioning between said recording unit and said sheet supplying unit has been completed.

32. A recording apparatus comprising:

a recording unit comprising a recess extending horizontally along a bottom portion thereof and having a platform shape so that the recording unit can stand by itself;

a sheet supplying unit connected to said recording unit by inserting a projection formed on said sheet supplying unit into said recess of said recording unit, wherein the projection projects from a lower and side surface of a body of the sheet supplying unit and forms the substantially L-shaped unit together with the body thereof so that the sheet supplying unit can stand by itself with a bottom surface of the body and a bottom surface of the projection;

a sheet inlet provided in said recording unit, said sheet inlet being opposed to a sheet outlet provided on said sheet supplying unit; and positioning means provided in said recording unit and said sheet supplying unit for positioning said recording unit and said sheet supplying unit into a position where said sheet inlet and said sheet outlet coincide with each other, wherein said positioning means is also for floating a lower surface of said projection of said sheet supplying unit from a lower surface of said recess after the positioning between said recording unit and said sheet supplying unit has been completed.

33. A recording apparatus according to claim 31 or 32, wherein said sheet supply unit comprises a recording sheet stacking portion and sheet supply means for feeding the recording sheet stacked on said stacking portion.

34. A recording apparatus according to claim 33, wherein positioning means of said unit has inclined guides ascending toward a mounting direction.

35. A recording apparatus having both a recording unit and a sheet supplying unit detachably mounted to said recording unit, said recording unit having an inlet on a surface thereof and said sheet supplying unit having an outlet on a surface thereof, said recording apparatus comprising:

a projection projecting from a lower and side surface of a body of the sheet supplying unit, said projection having extension in a substantially L-shape together with the body thereof, so that the sheet supplying unit can stand by itself with a bottom surface of the body and a bottom surface of the projection;

a recess formed in a bottom portion of the recording unit extending in accordance with the projection laterally; and a support formed extending laterally and protruding horizontally on the recording unit, said support having an upper and bottom surface and an area broader than the bottom surface of the recording unit, enabling the recording unit to stand by itself, wherein the sheet supplying unit is connected to the recording unit by inserting said projection into said recess with the surface of the recording unit on which the sheet inlet is formed, and the surface of said sheet supplying unit on which the sheet outlet is formed are opposed, upon being fitted to each other, and such that the supplying unit rides on the recording unit.

* * * * *

UNITED STATES PATENT AND TRADEMARK OFFICE

CERTIFICATE OF CORRECTION

PATENT NO. : 6,249,295 B1
DATED : June 19, 2001
INVENTOR(S) : Takehiko Kiyohara et al.

It is certified that error appears in the above-identified patent and that said Letters Patent is hereby corrected as shown below:

Column 1,
Line 60, "system:" should read -- system. --.

Column 7,
Line 11, "weights." should read -- weight. --.

Column 8,
Line 62, "18" should read -- 18, --.
Line 65, "19" should read -- 19, --.

Column 12,
Line 12, "geer" should read -- gear --.

Column 13,
Line 58, "foots" should read -- feet --.

Column 14,
Line 9, "rotatably-mounted" should read -- rotatably mounted --.
Line 60, "ing, sheet" should read -- ing sheet --.

Column 18,
Line 3, "$l_1xW_1 \leq W_1l_2xF_2$" should read -- $l_1xW_1 \leq l_2xF_2$ --.
Line 19, "the" (1st occurrence) should be deleted.

Column 20,
Line 4, "strengthed" should read -- strengthen --.
Line 11, "to he" should read -- to the --.
Line 42, "the" should be deleted.
Line 56, "706." should read -- 796. --.

UNITED STATES PATENT AND TRADEMARK OFFICE

CERTIFICATE OF CORRECTION

PATENT NO. : 6,249,295 B1
DATED : June 19, 2001
INVENTOR(S) : Takehiko Kiyohara et al.

It is certified that error appears in the above-identified patent and that said Letters Patent is hereby corrected as shown below:

Column 21,
Line 67, "at" should read -- at room --.

Signed and Sealed this

Twenty-sixth Day of March, 2002

*Attest:*

JAMES E. ROGAN
*Director of the United States Patent and Trademark Office*

*Attesting Officer*